United States Patent [19]

Shubert et al.

[11] Patent Number: 5,174,902

[45] Date of Patent: Dec. 29, 1992

[54] METHOD FOR REMOVING CATIONS AND ANIONS FROM AN ENGINE COOLANT LIQUID

[75] Inventors: David C. Shubert, Wichita; Galen R. Myers, Derby; Robert C. Richardson, Wichita, all of Kans.

[73] Assignee: BG Products, Inc., Wichita, Kans.

[21] Appl. No.: 485,939

[22] Filed: Feb. 27, 1990

[51] Int. Cl.⁵ .............................. C02F 9/00
[52] U.S. Cl. .................... 210/662; 210/668; 210/669; 210/685; 210/694
[58] Field of Search ............... 210/662–664, 210/668, 669, 685, 694, 767, 266

[56] References Cited

U.S. PATENT DOCUMENTS

| | | | |
|---|---|---|---|
| 2,029,232 | 1/1936 | Green | 251/104 |
| 2,222,516 | 11/1940 | Powell et al. | 141/1 |
| 2,388,836 | 11/1945 | Dunn | 134/169 |
| 2,537,215 | 1/1951 | Dunn | 134/169 |
| 2,835,234 | 5/1958 | Rasch et al. | 123/41.42 |
| 2,938,868 | 5/1960 | Carlson et al. | 210/662 |
| 3,034,521 | 5/1962 | Greenfield | 134/102 |
| 3,094,131 | 6/1963 | Williams | 134/98 |
| 3,115,145 | 12/1963 | Monteath, Jr. | 134/95 |
| 3,212,641 | 10/1965 | Komarmy et al. | 210/266 |
| 3,408,289 | 10/1968 | Gustafson | 210/669 |
| 3,409,218 | 11/1968 | Moyer | 237/12.3 |
| 3,645,402 | 2/1972 | Alexander et al. | 210/266 |
| 3,742,069 | 6/1973 | Hunter | 260/615 R |
| 3,985,648 | 10/1976 | Casolo | 210/27 |
| 4,083,399 | 4/1978 | Babish et al. | 165/95 |
| 4,154,674 | 5/1979 | Warshawsky et al. | 210/32 |
| 4,161,979 | 7/1979 | Stearns | 165/95 |
| 4,176,708 | 12/1979 | Joffe | 165/95 |
| 4,182,676 | 1/1980 | Casolo | 210/27 |
| 4,209,063 | 6/1980 | Babish | 165/95 |
| 4,213,474 | 6/1980 | Harrison | 134/102 |
| 4,260,827 | 4/1981 | Klinkmann et al. | 568/414 |
| 4,276,914 | 6/1981 | Albertson | 141/92 |
| 4,390,049 | 6/1983 | Albertson | 141/92 |
| 4,412,551 | 11/1983 | Peters et al. | 134/104 |
| 4,454,045 | 6/1984 | Perplies | 210/672 |

(List continued on next page.)

OTHER PUBLICATIONS

TABCO Antifreeze and Coolant, by Hi-Tech Industries Inc., 1988.
Arizona Automobile Dealers, Special Bulletin, Aug. 1989.

(List continued on next page.)

*Primary Examiner*—Ivars Cintins
*Attorney, Agent, or Firm*—John W. Carpenter

[57] ABSTRACT

An apparatus and method for removing particulates, hydrcarbons (such as oil), cations and anions including nitrite ions from a liquid, such as an engine coolant liquid having a freezing point depressant and situated in an internal combination engine cooling system. The apparatus has at least one filter for removing particulates and hydrocarbons; a strong acid cation exchange bed in the hydrogen form for removing cations; a strong base anion exchange bed in the hydroxide form for removing anions; and separator for separating gas containing nitrogen, such as nitric oxide and/or nitrogen dioxide, that is produced in the cation exchange bed and/or the anion exchange bed. The method for removing particulates, hydrocarbons, cations, anions and nitrite ions from an engine coolant liquid having a freezing point depressant comprises providing an engine coolant liquid having particulates, hydrocarbons, cations, anions and nitrite ions; passing the engine coolant liquid through a zone for filtering wherein particulates and hydrocarbons are removed from the engine coolant liquid; and passing the engine coolant liquid through a strong acid cation exchanger bed in the hydrogen form wherein cations are removed from the engine coolant liquid and nitrite ions are converted into nitric oxide and/or nitrogen dioxide. The method further comprises passing the engine coolant liquid through a strong base anion exchanger bed in the hydroxide form wherein anions are removed from the engine coolant liquid; and subsequently separating the nitric oxide and/or nitrogen dioxide from the engine coolant liquid to produce an engine coolant liquid having the freezing point depressant.

52 Claims, 10 Drawing Sheets

U.S. PATENT DOCUMENTS

| | | | |
|---|---|---|---|
| 4,532,045 | 7/1985 | Littmann | 210/668 |
| 4,553,587 | 11/1985 | Traylor | 165/95 |
| 4,597,416 | 6/1986 | Scales | 137/899 |
| 4,606,363 | 8/1986 | Scales | 134/111 |
| 4,627,798 | 12/1986 | Thomas | 417/415 |
| 4,655,930 | 4/1987 | Kuhn et al. | 210/668 |
| 4,751,006 | 6/1988 | Becker | 210/774 |
| 4,772,402 | 9/1988 | Love | 210/804 |
| 4,783,266 | 11/1988 | Titch et al. | 210/695 |
| 4,790,882 | 12/1988 | Barres | 134/22.18 |
| 4,791,890 | 12/1988 | Miles et al. | 123/41.14 |
| 4,793,403 | 12/1988 | Vataru et al. | 165/95 |
| 4,809,769 | 3/1989 | Vataru et al. | 165/1 |
| 4,899,807 | 2/1990 | Vataru et al. | 165/1 |
| 4,901,786 | 2/1990 | Vataru et al. | 165/1 |
| 4,946,595 | 8/1990 | Miller | 210/767 |

OTHER PUBLICATIONS

Hazardous Waste Regulations and the Automotive Shop by Gillespie, BG Products (no date).

"Anti-Freeze Recycling System" Glyclean by FPPF Chemical Co. Inc., 1988.

Technical Data Sheet, 1987, by FPPF Chemical Co. Inc.

Kleer-Flo ®, General Catalog No. KF-36, by Kleer-Flo Co., 1988.

"The Pressurized Cooling System" by Bar's Leaks Inc., Holly, Mich., published 1983.

SAE Technical Paper Series (881270), Sep. 1988, "Filtration of Coolants for Heavy Duty Engines" by Hudgens et al.

"Forum on Coolant Disposal and Recycling", National Automotive Radiator Service Association National Meeting, Atlanta, Mar. 30, 1989.

"Reconstituted Anti-Freeze" by Gen. Motors, 1989.

IONAC ® Ion Exchange Resins by Sybron, Sybron Chemicals Inc., 1985.

Dissolved and Colloidal Silica Removal by Anion Exchange, by McGarvey et al., 1977.

IONAC ® C-249 by Sybron, Sybron Chemicals Co., 1986.

Efficient Operation of Strongly Basic Anion Exchangers by McGarvey, 1978.

IONAC ® AFP-329 by Sybron Chemicals Co., 1984.

Fundamental and Basic Theories Regarding the Proper Use of Modern Day Ion Exchange Resins, by McGarvey et al., 1979.

Product Catalog by Norit, American Norit Co., no date.

Darco ® Activated Carbon, Product Information Bulletin No. 5124, by Am. Norit Co., 1985.

Norit ® Activated Carbon, by American Norit Co. Inc., Bulletin No. RB-45-11P effective 1986.

Norit ® Activated Carbon by American Norit Co. Inc., Product Information Bulletin No. 202, 1988.

Norit ® Activated Carbon by American Norit Co., Product Information Bulletin No. 308, 1988.

Norit ® Activated Carbon by Am. Norit Co., Product Information No. 122, 1986.

Norit ® Activated Carbon by Am. Norit Co., Bulletin No. N-1, 1989.

Petro Dar Co TM Granular Activated Carbon by Am. Norit Co., 1974.

"Product Catalog" by American Norit Co., (no date) probable date is before 1989.

"The BG Hot Line" by BG Products, 1989.

"Profitmakers" from Business, Nov. 1988.

"State Fines C.R. Radiator Shop 33,920" published Feb. 6, 1990 in The Cedar Rapids Gazette.

Article No. 90-4-10, Cooling System, by Ford Motor Co. (no date).

Reconstituted Anti-Freeze, Service Bulletin, No. 90-4-9-6B by General Motors Corp., 1989.

"Auto-Armor ® Entire Car Protection" published 1987 by Auto Armor, Westchester, Ill.

Product News published in Lubrication Engineering, Mar. 1990.

"Vac-U-Flush Coolant Protection System" by Daubert Chemical Co., 1987.

Nox Rust ® by Dow Corning (no date).

"Detailing the Market", Automotive Marketing, Oct. 1989.

Material Safety Data Sheet, Cobratec ® Colorant 0950 by PMC Inc., 1987.

Material Safety Data Sheet, Cobratec ® Colorant 7335 by PMC Inc., 1987.

Order Entry No.: X26Rs8031 of Cobratec ® Colorant 0950 by PMC Inc.

Material Safety Data Sheet of Pluronic L61, Product No. 588290 by BASF Corp., 1987.

Cobratec ® Colorant 7335, Order Entry No. X26RS8030 by PMC Inc. (no date).

"General Information" by BG Products Inc., Sep. 28, 1989.

Product Information Bulletin No. 213 on Norit ® Activated Carbon by Am. Norit Co. Inc., 1987.

Product Information Bulletin No. 5312 on Darco ® Activated Carbon by Am. Norit Co. Inc., 1986.

Culligan Commercial-Industrial Systems by Culligan International Co., 1977.

Think!! Where is Your Used AntiFreeze Going?? by BG Products Inc., Sep. 1989.

Introduction to Industrial Ion Exchange by McGarvey, Sybron Chemicals Inc. (no date, probably published before 1988).

Coolant Forum Convention Program Raises More Questions, 1989, Automotive Cooling Journal.

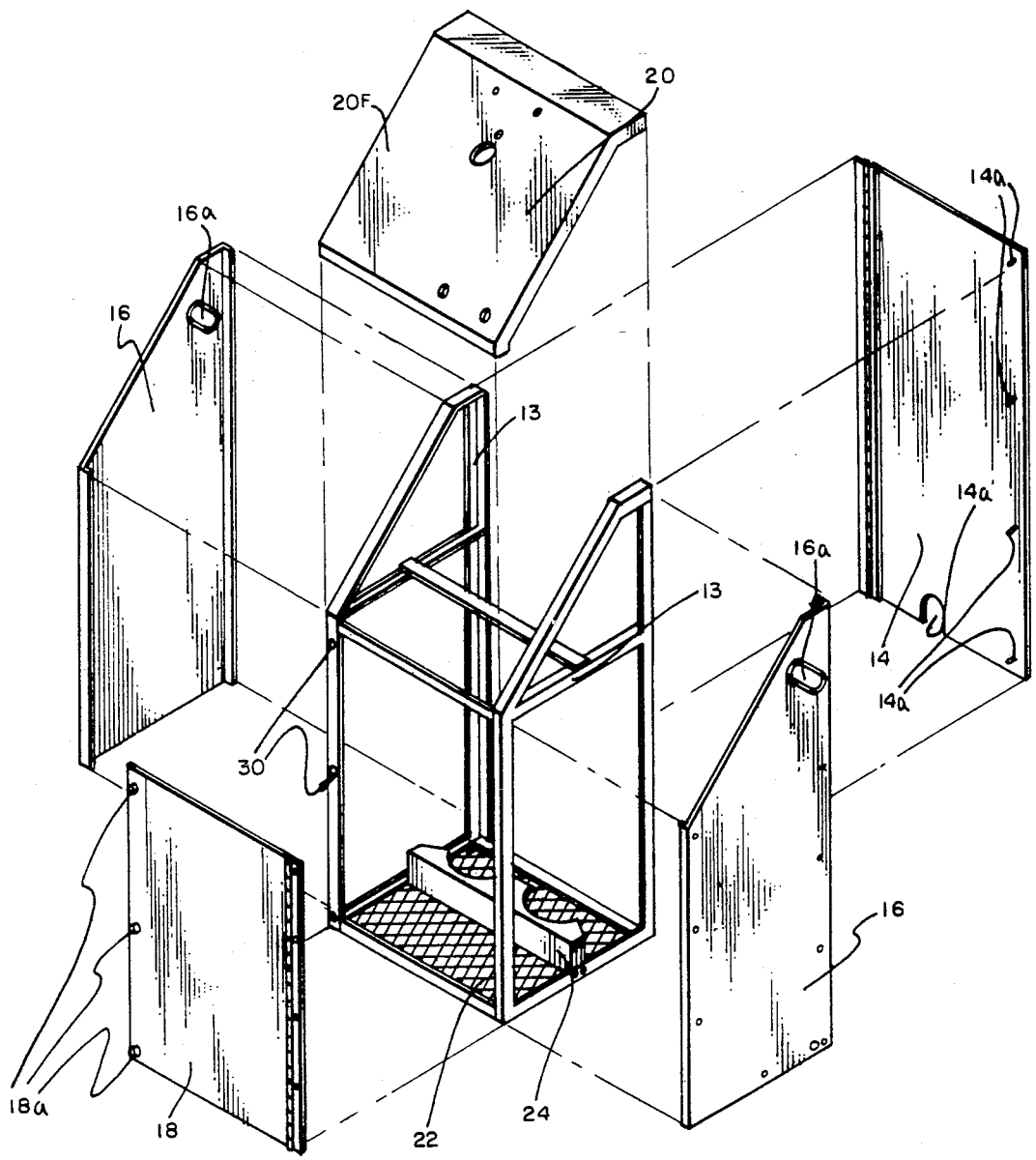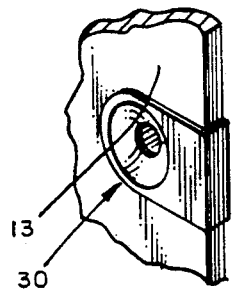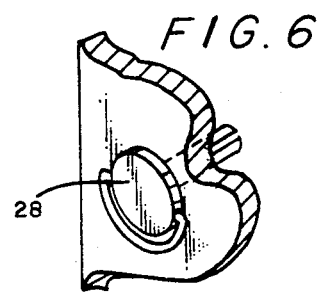
FIG. 4
FIG. 5
FIG. 6

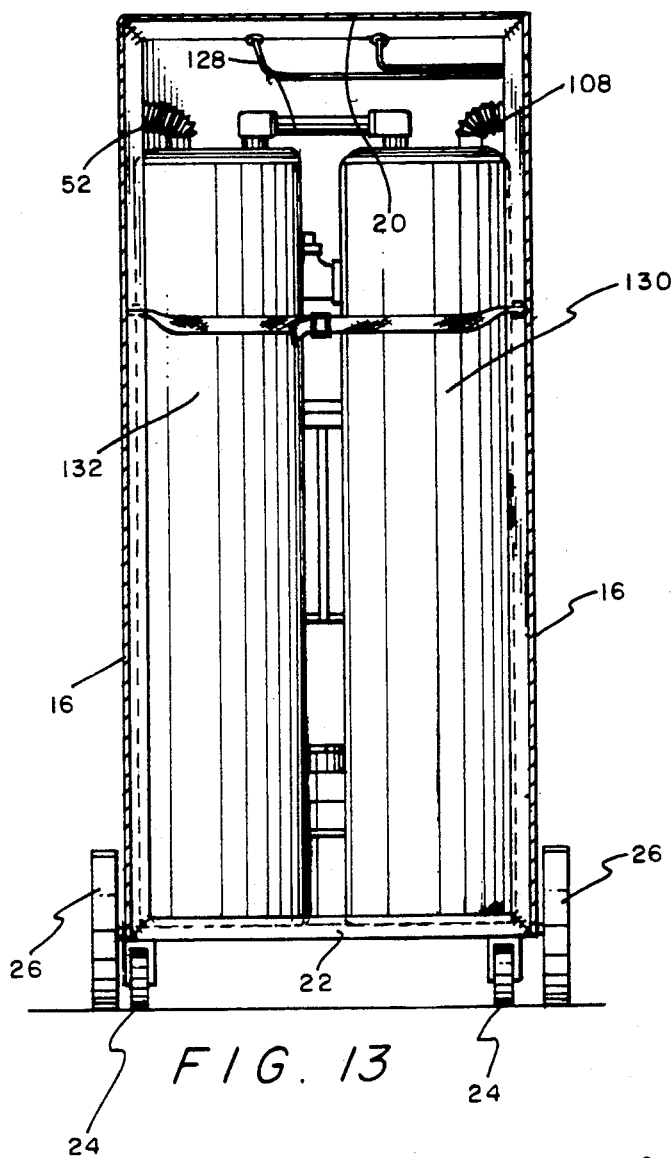
FIG. 13
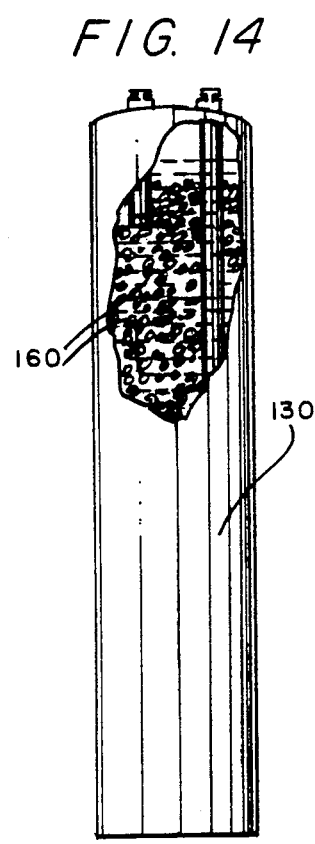
FIG. 14
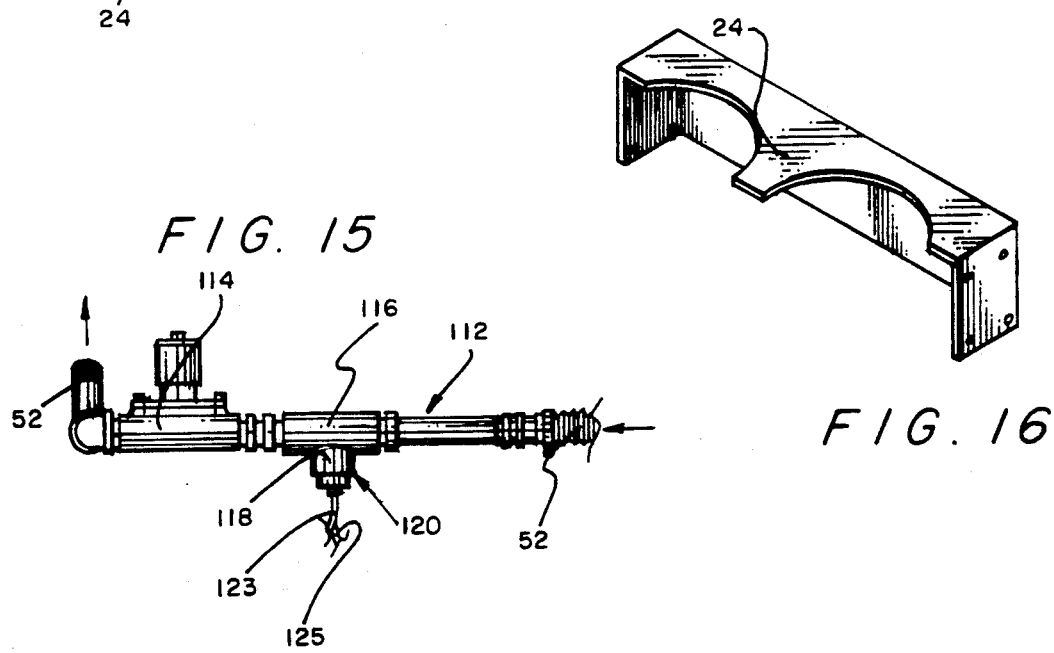
FIG. 15
FIG. 16

METHOD FOR REMOVING CATIONS AND ANIONS FROM AN ENGINE COOLANT LIQUID

BACKGROUND OF THE INVENTION

1. Field of the Invention

This invention is related to an apparatus and method for removing particulates, ions and impurities from an engine coolant liquid. More specifically, this invention provides for an apparatus and method for removing particulates, impurities, and cations and anions from an engine coolant liquid having a freezing point depressant and situated in an internal combustion engine cooling system.

2. Description of the Prior Art

One of the biggest problems facing today's automotive and industrial shops is the disposal of hazardous waste. On Oct. 17, 1986 SARA Title III was signed into law by the U.S. Congress. Section 313 of this legislation designated ethylene glycol, the major component in antifreeze, as a toxic chemical. Furthermore, the EPA designates ethylene glycol as hazardous waste under 40 CFR 414.60. The regulatory impact on automotive service stations and other industrial shops would depend on the volume of antifreeze to be disposed of and other factors, especially when spent antifreeze has to be periodically replaced. Presently, there are but two viable options or alternatives for discarding spent antifreeze; namely, collect and store it in drums and/or pay a hazardous waste collector to transport it for disposal. Both of these options or alternatives are costly, especially when compared to disposing the spent antifreeze illegally by merely pouring it down the drain.

Antifreeze is a rather complex mixture of chemical components designed to perform the following functions in a vehicle:

(a) protect against overheating and freezing;
(b) protect the many dissimilar metals within the cooling system (copper, brass, steel, iron, aluminum and lead) from corrosion;
(c) buffer against acidic contamination (blow by gases, glycol degredation products);
(d) prevent foaming;
(e) prevent hard water scaling;
(f) reduce consequences of oil fouling; and
(g) protect diesel wet-sleeve liners from cavitation damage.

All of those functions are important and demanding on an engine liquid coolant. Each must be specifically considered or, at some point, engine damage will occur, resulting in sometimes costly repair. To obtain the optimum protection, the engine liquid coolant must have a well balanced additive package that may consist of up to 15 different inhibitors in addition to the more commonly known components such as water, ethylene glycol, and dye. Most inhibitors are introduced as sodium or potassium salts and usually are specific in providing corrosion inhibition to one or two metals. As antifreeze ages and accumulates miles or hours in a vehicle's cooling system, it also accumulates many different types of contaminants. These include oil from leaking oil coolers and water pump lubricants, corrosion products in the form of metal ions and metal hydroxides (e.g. aluminum hydroxide can be produced through aluminum cylinder head corrosion), and acids from blowby gasses and glycol degredation products such as glycolic, formic, oxalic, acetic acid. Other impurities may be present in the water used to dilute the antifreeze concentrate. These are ions, more commonly known as "minerals", and they include chlorides, sulfates, carbonates, and metal cations such as calcium and magnesium. Chlorides and sulfates are corrosive, and calcium and magnesium cause scaling. In areas with very poor water quality, trace amounts of metals may also be present, especially iron and lead.

There are a number of conventional processes available for purifying and/or recycling antifreeze that has been contaminated. The most common conventional type of process available at present is based on a simple filtration method. The used antifreeze coolant is collected, pured into a filtration unit, filtered through a paper filter of varying porosities, discharged back into the vehicle, and then treated with a concentrated additive package to restore the inhibitor level. In this process, although the antifreeze has been "recycled" it has not been purified to any degree. It may appear cleaner as the filter will remove oil and solid contaminants large enough to be trapped by the filter which will improve its clarity, but the ionic species such as the impurities in the water, the acids, and the free metals will not have been removed and will be recycled back into the vehicle cooling system. Another conventional filtering process utilizes diatomaceous earth as the filtering medium. A diatomaceous earth filtering medium has a greater surface filtering area than a paper filter. This method is at least slightly more effective than paper or composition filtration, but the bulk of the impurities are still put back into the vehicle cooling system.

A problem with both of these conventional filtering processes is the lack of control over the inhibitor level in the final coolant solution. Both rely on adding a concentrated additive package to the system after the filtration step. Thus, the old additives retained in the filtered coolant plus the addition of concentrated inhibitors may lead to serious overconcentration. This may result in the precipitating or otherwise coming out of solution to deposit in cool, low lying areas of the vehicle cooling system, thus reducing flow and overall efficiency. They may also cause seal leaks such as in the water pump or plug filters in diesel cooling systems.

Another conventional approach to recycling antifreeze is the distillation process, which is one of the oldest chemical purification processes known. It is truly a "purification" process, unlike the filtration method, because it physically separates the water and glycol from all additives, impurities, contaminants, and even the dye. There are two ways of performing a distillation; namely, by the flash distillation process or by the simple distillation process.

The flash distillation process is a process in which the used antifreeze is added to a vessel preheated to a temperature above the boiling point of water and the glycol constituents. This essentially vaporizes the water and glycol and it is then condensed from a gaseous form back into a liquid. Non-volatile impurities are left behind in the distillation vessel. The condensate or distillate can then be checked for a glycol and inhibitor level and restored to a "recycled" condition. The advantage to this method is that it is much more effective than the simple filtration method at removing all of the contaminants, including ionic species.

The simple distillation process is very similar to the flash method with respect to the equipment employed. However, the used antifreeze is poured into the distillation chamber and then heat is applied slowly. This produces a boiling point range in which water will come off first to be collected separately, with the glycol boiling off second. If there are appreciable quantities of other glycols besides ethylene such as propylene, triethylene, or tetraethylene, the boiling point range of the antifreeze will be quite wide in terms of temperature. The simple distillation method is perhaps the slowest and most time consuming of the conventional processes but it is highly effective at removing impurities and providing pure water and glycol. It also formulates the waste into a solid form that is much less expensive to dispose of than drums of used antifreeze. The distilled water can also be used for other purposes, such as water for a car wash unit or battery water. The process does require operator manipulation and monitoring to determine when all of the water has all been condensed and when the glycol begins to distill.

Thus, what is needed and what has been invented by us is a fast, economical and ecologically advantageous method and apparatus for removing particulates and ions (i.e., cations and anions) from a liquid, such as the engine coolant liquid from the cooling system of a vehicle.

SUMMARY OF THE INVENTION

The present invention broadly accomplishes its desired objects by broadly providing an apparatus and method for removing essentially all impurities including particulates and ions, such as cations and anions, from a liquid, such as an engine coolant liquid emanating from the cooling system of a vehicle. The apparatus broadly comprises a means for passing a liquid having ions, including nitrogen containing ions and such as nitrate and nitrite ions, through at least one ion-exchanger bed wherein at least part of the ions are removed and at least part of the nitrogen containing ions is converted into nitrogen containing compounds (e.g. nitrous acid and gas containing nitrogen, such as nitric oxide, nitrogen dioxide, and mixtures thereof) to produce a liquid with at least part of the ions removed and having the nitrogen containing compounds. The apparatus also comprises a means, communicatively engaged to and with the ion exchanger bed, for removing the nitrogen containing compounds from the liquid to produce a liquid having at least part of the ions removed and at least part of the nitrogen containing compounds removed. The method for removing ions from liquid broadly comprises the steps of:

(a) passing a liquid having ions, including nitrogen containing ions, through an ion-exchanger bed wherein at least part of the ions are removed and at least part of the nitrogen containing ions is converted into nitrogen containing compounds to produce a liquid with at least part of the ions removed and having nitrogen containing compounds; and (b) passing the produced liquid of step (a) through a means for removing nitrogen containing compounds to produce a liquid with at least part of the ions removed and with at least part of the nitrogen containing compounds removed.

The present invention further accomplishes its desired objects by further broadly providing an apparatus and method for treating and removing particulates, ions, and nitrite ions from an engine coolant liquid and situated in a cooling system of an internal combustion engine comprising (a) a means for removing from a cooling system of an internal combustion engine an engine coolant liquid which is situated in the cooling system of the internal combustion engine and contains particulates, ions, and nitrite ions; (b) a means, in communication with the means for removing an engine coolant liquid, for removing particulates from the engine coolant liquid containing particulates, ions, and nitrite ions; (c) a means, in communication with the means for removing particulates from the engine coolant liquid, for removing ions from the engine coolant liquid containing ions and wherein nitrite ions are converted into gaseous nitrogen containing compounds such as nitrogen oxides; (d) a means, in communication with the means for removing ions from the engine coolant liquid, for removing the nitrogen containing compounds from the engine coolant liquid containing the gaseous nitrogen containing compounds; and (e) a means, in communication with the means for removing the gaseous nitrogen containing compounds, for returning the engine coolant liquid to the cooling system of the internal combustion engine. The method for treating and removing particulates, ions, and a nitrogen containing compound from an engine coolant liquid situated in a cooling system of an internal combustion engine broadly comprises the steps of:

(a) removing, from a cooling system of an internal combustion engine to the exterior thereof, an engine coolant liquid which is situated in the cooling system of the internal combustion engine and contains particulates, ions, and nitrite ions;

(b) passing the engine coolant liquid through a filtration zone wherein a majority of the particulates are removed to produce an engine coolant liquid having the ions and the nitrite ions;

(c) passing the produced engine coolant liquid of step (b) through a means for removing ions wherein at least part of the ions is removed and nitrite ions are converted into nitrogen containing compounds such as nitrogen oxides, to produce a liquid containing the nitrogen containing compounds;

(d) passing the produced engine coolant liquid of step (c) through a means for removing the nitrogen containing compounds wherein at least part of the nitrogen containing compounds is removed; and (e) returning subsequently the engine coolant liquid, produced from the means for removing the nitrogen containing compounds, to the cooling system of the internal combustion engine.

The present invention still yet further accomplishes its desired objects by more particularly providing an apparatus and method for removing particulates, hydrocarbons (such as oils), cations, anions, and nitrite ions from an engine coolant liquid having a freezing point depressant. The apparatus more particularly comprises (a) a first mechanical filtering system wherein part of the particulates are removed from the engine coolant liquid to produce an engine coolant liquid having residual particulates, hydrocarbons (such as oils), cations, anions, nitrite ions and the freezing point depressant; (b) a pump means for pumping the engine coolant liquid received from the first mechanical filtering system down line towards a chemical filtering means for filtering and wherein at least part of the hydrocarbons (such as oils) is to be removed; (c) a chemical filtering means which receives engine coolant liquid from the pump means and filters out or removes at least part of the hydrocarbons (such as oils) from the engine coolant liquid to produce an engine coolant liquid having residual particulates, cations, anions, nitrite ions and the freezing point depressant; (d) a second mechanical filtering means which receives engine coolant liquid from the chemical filtering means and filters out or removes at least part of the residual particulates to produce an engine coolant liquid having cations, anions, nitrite ions, and the freezing point depressant; (e) a strong acid cation exchange bed in the hydrogen form for receiving engine coolant liquid from the second mechanical filtering means and removing at least part of the cations and for converting the nitrite ions into a gas containing nitrogen selected from the group consisting of nitric oxide, nitrogen dioxide, and mixtures thereof, to produce an engine coolant liquid having anions, the gas containing nitrogen, and the freezing point depressant; (f) a strong base anion exchange bed in the hydroxide form wherein at least part of the anions is removed to produce an engine coolant liquid having the gas containing nitrogen and the freezing point depressant; and (g) an activated particulate carbon bed for receiving the engine coolant liquid from the anion exchange bed and for removing or separating out at least part of the gas containing nitrogen to produce an engine coolant liquid having the freezing point depressant. The method for removing particulates, hydrocarbons (such as oils), cations, anions and nitrite ions from an engine coolant liquid having a freezing point depressant comprises the steps of:

(a) providing an engine coolant liquid having particulates, hydrocarbons, cations, anions and nitrite ions, and a freezing point depressant;

(b) passing the engine coolant liquid of step (a) through a first mechanical filtering means for filtering and wherein part of the particulates are removed to produce an engine coolant liquid having residual particulates, hydrocarbons, cations, anions, nitrite ions, and the freezing point depressant;

(c) passing the produced engine coolant liquid of step (b) through a zone for pumping wherein the produced engine coolant liquid of step (b) is pumped towards a chemical filtering means for filtering and wherein at least part of the hydrocarbons is to be removed;

(d) passing the pumped engine coolant liquid of step (c) through a chemical filtering means for filtering and wherein at least part of the hydrocarbons is removed to produce an engine coolant liquid having residual particulates, cations, anions, nitrite ions and the freezing point depressant;

(e) passing the produced engine coolant liquid of step (d) through a second mechanical filtering means for filtering and wherein at least part of the residual particulates is removed to produce an engine coolant liquid having cations, anions, nitrite ions, and the freezing point depressant;

(f) passing the produced engine coolant liquid of step (e) through a strong acid cation exchange bed in the hydrogen form wherein at least part of the cations is removed and at least part of the nitrite ions is converted into a gas containing nitrogen and selected from the group consisting of nitric oxide, nitrogen dioxide, and mixtures thereof, to produce an engine coolant liquid having anions, the gas containing nitrogen, and the freezing point depressant;

(g) passing the produced engine coolant liquid of step (f) through a strong base anion exchange bed in the hydroxide form wherein at least part of the anions is removed to produce an engine coolant liquid having the gas containing nitrogen and the freezing point depressant; and (h) passing the produced engine coolant liquid of step (g) through a bed of activated particulate carbon wherein at least part of the gas containing nitrogen is removed to produce an engine coolant liquid having the freezing point depressant.

It is therefore an object of the present invention to provide an apparatus for removing particulates, hydrocarbons (such as oils and the like), cations, anions, and nitrite ions from a liquid, such as an engine coolant liquid, preferably having a freezing point depressant.

It is another object of the present invention to provide a method for removing particulates, hydrocarbons (such as oils and the like), cations, anions, and nitrite ions from a liquid, such as an engine coolant liquid, preferably having a freezing point depressant.

These, together with the various ancillary objects and features which will become apparent to those skilled in the art as the following description proceeds, are attained by this novel apparatus and method, a preferred embodiment being shown with reference to the accompanying drawings, by way of example only, wherein:

BRIEF DESCRIPTION OF THE DRAWINGS

FIG. 4 is a perspective segmented view of the cabinet of FIG. 1 without the apparatus of the present invention;

FIG. 5 is a partial perspective view of the female receiving end of the fasteners for the front and rear doors of the cabinet in FIG. 1;

FIG. 6 is a partial perspective view of the male end of the fasteners for the front and rear doors of the cabinet in FIG. 1;

FIG. 13 is a rear elevational view of the cabinet with the rear door having been removed to expose the two ion exchange containers in the rear of the apparatus of the present invention;

FIG. 14 is side elevational view of one of the ion exchange containers with the insides partially exposed to show the ion exchange resins;

FIG. 15 is a partial view of a segment of the outlet conduct having sensors to detect the resistance and/or conductivity of the engine coolant liquid, and further having the electronic check valve;

FIG. 16 is a perspective view of the rack that assists in holding the ion exchange containers in place within the cabinet;

DETAILED DESCRIPTION OF THE INVENTION

Figure 1:
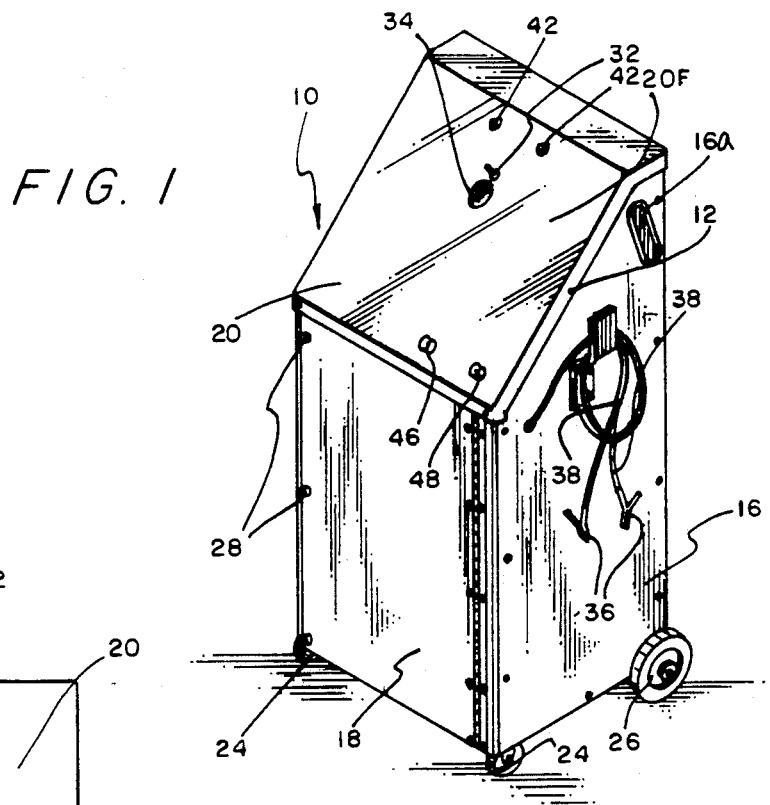
FIG. 1 is a perspective view of the cabinet containing the apparatus of the present invention.
Figure 2:
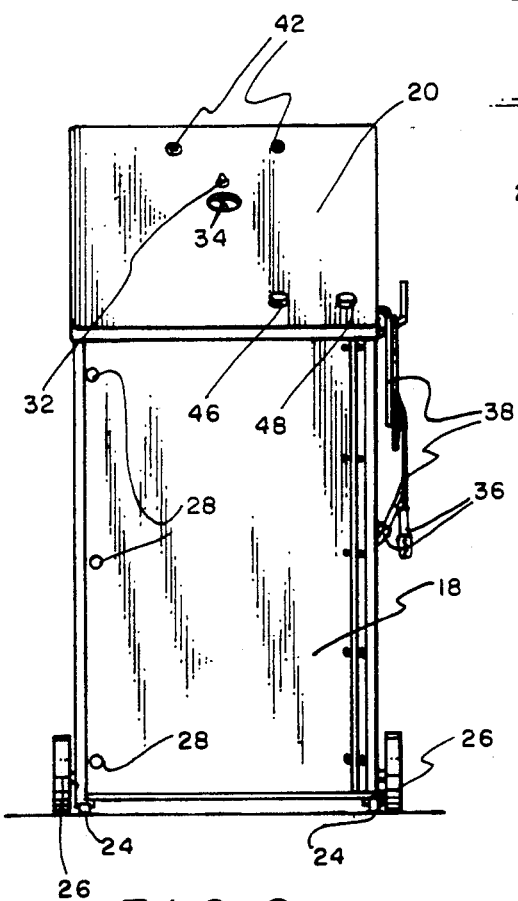
FIG. 2 is a front elevational view of the cabinet in FIG. 1.
Figure 3:
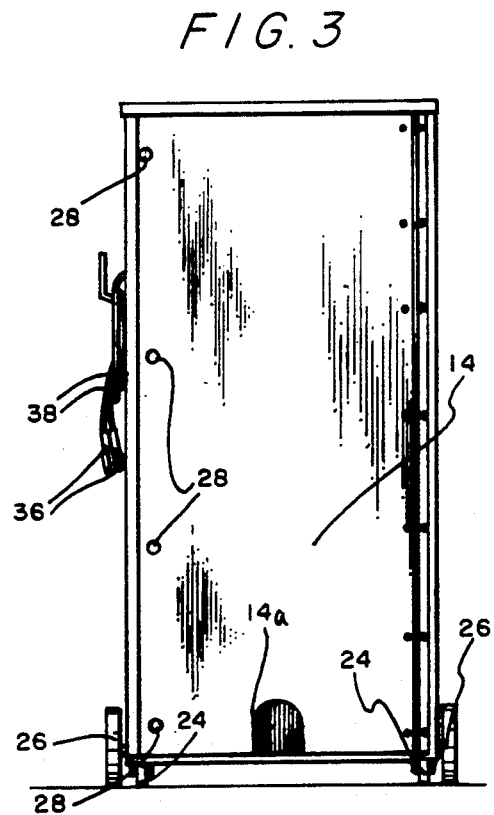
FIG. 3 is a rear elevational view of the cabinet in FIG. 1.
Figure 7:
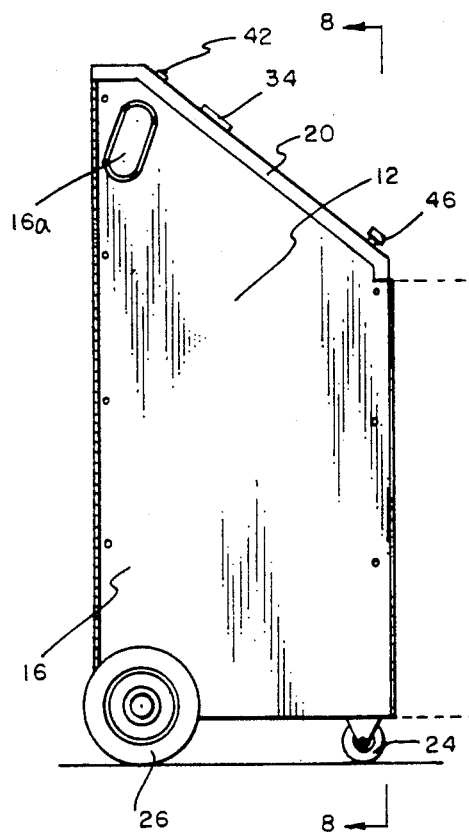
FIG. 7 is an end elevational view of the cabinet of FIG. 1 with the front door shown to be swinging open as a dotted line representation.

Referring in detail now to the drawings wherein similar parts of the invention are identified by like reference numerals there is seen an apparatus, generally illustrated as 10, which is for removing cations, anions, hydrocarbons (e.g., oils) and particulate solids from a liquid, preferably an engine coolant liquid which may or may not include a freezing point depressant such as glycols (e.g. ethylene glycol, propylene glycol, etc.). For purposes of describing the present invention, the "liquid" will be an engine coolant liquid having a freezing point depressant and termed "engine antifreeze coolant liquid". It should be understood that the spirit and scope of the present invention is to include "any liquid" and not be limited to engine coolant liquid which may or may not include an antifreeze/freezing point depressant component. In one preferred embodiment of the present invention, the apparatus 10 of this invention may be interposed in an engine antifreeze coolant circuit for continuously filtering particulate solids and hydrocarbons (oils) from the antifreeze coolant while also removing anions and cations therefrom, including potentially deleterious nitrite ions. In another preferred embodiment of the present invention, the apparatus 10 may be employed alone and not in communication with an engine antifreeze coolant circuit to treat an engine coolant antifreeze liquid that has been provided in bulk (such as in drums) to remove cations, anions, hydrocarbons, and particulate solids from the engine antifreeze coolant liquid. The apparatus 10 of the present invention also possesses the capabilities of measuring and indicating the resistance and/or conductivity of the antifreeze coolant as a measure of the degree of purification of the antifreeze coolant from contaminating ions and particulates.

The apparatus 10 has a cabinet 12 (see FIG. 1) which includes a frame 13, a rear door 14, pivotally secured to the rear of the frame 13, a pair of opposed side walls 16—16 connected to the sides of the frame 13, and a front door 18 pivotally attached to the front of the frame 13. The cabinet 12 also has a top 20 which defines a slanted face 20F, and a floor 22 upon which a rack 24 is mounted. Both the top 20 and the floor 22 connect to the frame 13 to be supported thereby. The cabinet 12 is rotatably supported by casters 24—24 and rear wheels 26—26. Each side wall 16 has an aperture 16a to provide an opening for receiving a hand such that the user of the apparatus 10 may readily move the cabinet 12 with the aid of the casters 24—24 and the wheels 26—26. The rear door 14 has an aperture 14a in the lower end thereof wherethrough a foot of a user may pass and rest upon the floor 22 to provide an additional means for readily moving the cabinet 12. When the user inserts a foot through aperture 14a and further inserts hands through the pair of apertures 16a—16a in the pair of opposed sides 16—16, the cabinet 12 may readily be moved by rolling the same on both the casters 24—24 and the rear wheels 26—26, or by rolling the same on only the two rear wheels 26—26, similar to moving a two wheel dolly. To posture the cabinet 12 such as to balance and rest upon only the two rear wheels, the user, with a foot resting on the floor 22 through the aperture 14a and with the hands grasping the pair of opposed sides 16—16 of the cabinet 12 through the apertures 16a—16a, leans or pulls the cabinet 12 rearwardly until the casters 24—24 are off the support surface and the entire weight of the apparatus 10 is balanced upon the rear wheels 26—26. In such a posture, the cabinet 12 may readily be moved by pushing or pulling until the two rear wheels 26—26 commence rolling.

The rear door 14 and the front door 18 are respectively provided with a plurality of door apertures 14a and 18a wherethrough fasteners 28 (see FIG. 6) may be inserted to be received by female receiving ends 30 (see FIG. 5) each of which are spacedly secured along the frame 13 such as to register with door apertures 14a and 18a. When a fastener 28 is inserted through a door aperture 14a and/or 18a and through the female end 30 and turned in a predetermined direction, the rear door 14 and the front door 18 are fastened against the frame 13. When all fasteners 28 are rotated in the opposite direction to the predetermined direction and removed from within the female ends 30 and from the door apertures 14a and 18a, the rear door 14 and the front door 18 are both free to be pivotally opened to expose the remaining parts or elements of the apparatus 10 within the cabinet 12.

Exposed through and from various opening in the slanting face 20F of the top 20 is an on/off switch 32, and a pressure gauge 34 for indicating when the filters (which will be identified below) of the apparatus 10 are blocked. When the pressure gauge 34 reads a certain pressure, such pressure indicates blockage which typically occurs when the filters are plugged and have to be removed or cleaned. A pair of electrical clamps 36—36 with respective depending conductors 38—38 pass through the side wall 16 such as to be freely available to engage a battery 40 (see FIG. 20) of a car in order to provide a power source for the electronic elements (e.g. the pump, the sensors, etc.) of the apparatus 10. A pair of indicators 42—42, which may be either lights or meters, are part of a sensoring system that will be explained in detail below. The sensoring system including the indicators 42—42 function to indicate the resistance and/or conductivity of the engine antifreeze coolant liquid. The sensoring system also functions as a determiner as to whether or not an upstream ion exchange zone (which will be identified below) is functioning properly and/or has not become exhausted. An exhausted ion exchange zone is no longer capable of effectively removing ions from a liquid, such as the engine antifreeze coolant liquid. As previously mentioned, one of the capabilities of the apparatus 10 of this invention is measuring and indicating the resistance and/or conductivity of the engine antifreeze coolant liquid as a measure of the degree of purification of the antifreeze coolant from contaminating ions, dissolved solids and particulates. The sensing system including the indicators 42—42 can be set or calibrated to indicate any predetermined resistance or conductivity, which is preferably a 20,000 ohms resistance or a 50 micromhos of conductivity. A resistance greater than 20,000 ohms or a conductivity of less than 50 micromhos would indicate an acceptable purification of the engine antifreeze coolant liquid. The higher the resistance of the engine antifreeze coolant liquid, the lesser is the concentration of contaminating ions, dissolved solids and particles. Similarly, the higher the conductivity of the engine antifreeze coolant liquid, the greater is the concentration of contaminating ions, dissolved solids and particles. Thus, if the indicators 42—42 are lights which are calibrated through and/or in the sensing system to illuminate when the resistance of the engine antifreeze coolant liquid is of 50 micromhos or greater, when highly contaminated engine antifreeze coolant liquid is passed through the apparatus 10 including the sensing system, the indicators 42—42 will illuminate because the engine antifreeze coolant liquid is contaminated with dissolved ionic solids and particulates and the like beyond the acceptable level. When the apparatus 10 of this invention has sufficiently purified the engine antifreeze coolant liquid of undesirable ions, dissolved solids and particulates, the resistance or conductivity of the engine antifreeze coolant liquid will be greater than 20,000 ohms or less than 50 micromhos, respectively, and the indicators 42—42 will cease to illuminate, indicating an engine antifreeze coolant liquid that has been sufficiently purified of ions and/or particulates. The indicators 42—42 may be a pair of different color lights calibrated through and/or in the sensing system to disilluminate at diverse resistance levels and conductivity levels for the engine antifreeze coolant liquid. Thus, one indicator 42 may be a yellow light calibrated through and/or in the sensing system to disilluminate at 20,000 ohms or greater resistance or 50 micromhos or less conductivity, and the second indicator light 42 may be a red light calibrated through and in the sensing system to disilluminate at another resistance or conductivity, for example 50,000 ohms or greater resistance or 20 micromhos or less conductivity. When highly contaminated engine antifreeze coolant liquid is initially passed through the apparatus 10 including the sensing system, both the red indicator light 42 and the yellow indicator light 42 will be illuminated. After the highly contaminated engine antifreeze coolant liquid has passed through the apparatus 10 a sufficient number of times such that the resistance or conductivity of same is respectively greater than or equal to 20,000 ohms, or less than or equal to 50 micromhos, the red indicator light 42 will disilluminate or go out, while the yellow indicator light 42 remains lit. The less contaminated engine antifreeze coolant may be continually circulated through the apparatus 10 until the yellow indicator light 42 disilluminates or goes out, indicating that the engine antifreeze coolant has been purified and/or cleansed of undesirable ions, dissolved solids and particulates such that the resistance is greater than or equal to 20,000 ohms or the conductivity is less than or equal to 50 micromhos. It is readily apparent and within the spirit and scope of the present invention that the sensing system including the indicators 42—42 may be calibrated to illuminate or disilluminated at any desired resistance or conductivity level for the engine antifreeze coolant liquid. In a more preferred embodiment of the present invention as will be more fully explained in greater detail below, the sensing system includes only one indicator 42 (see FIGS. 8 and 20) which will indicate, such as through illumination, when the previously suggested upstream ion exchange zone (which will be more fully identified below) has become exhausted. It is intended that contaminated engine antifreeze coolant liquid will be sufficiently purified of contaminating ions with one pass through the apparatus 10 of this invention. Thus, after one pass, if the contaminated engine antifreeze coolant liquid has not been sufficiently expunged of undesirable ions, the ion exchange zone is not effectively performing its function of removing contaminating ions from contaminated engine antifreeze coolant liquid and the one indicator 42 will illuminate to indicate such. When the one indicator 42 is illuminated, the operator should then investigate the ion exchange zone to determine if it has become exhausted and is no longer capable of removing contaminating ions from a contaminated engine antifreeze coolant liquid.

Figure 8:
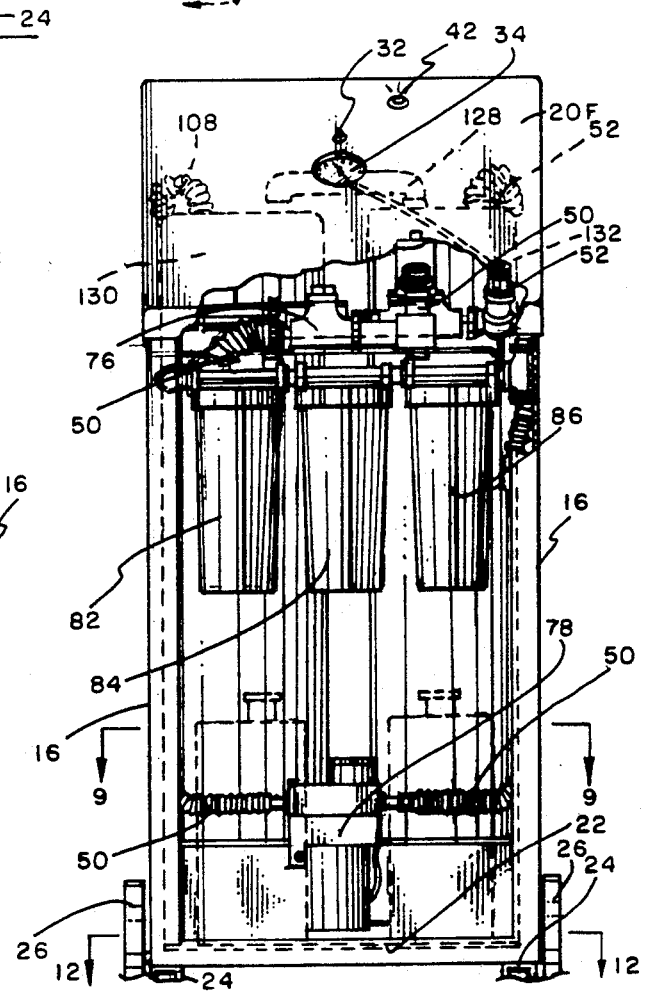
FIG. 8 is a vertical sectional view taken in direction of the arrows and along the plane of line 8—8 in FIG. 7.
Figure 9:
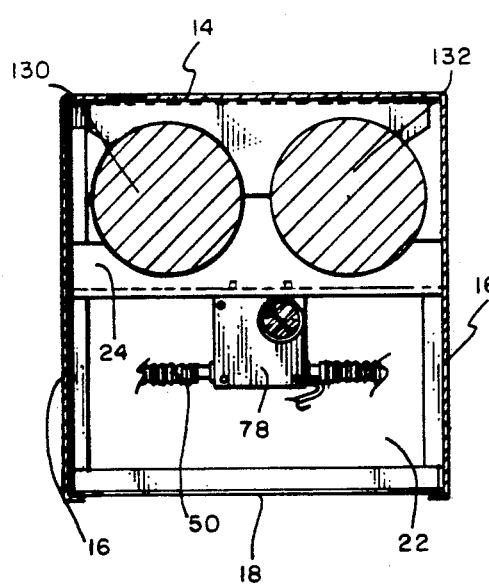
FIG. 9 is a horizontal sectional view taken in direction of the arrows and along the plane of line 9—9 in FIG. 8.
Figure 19:
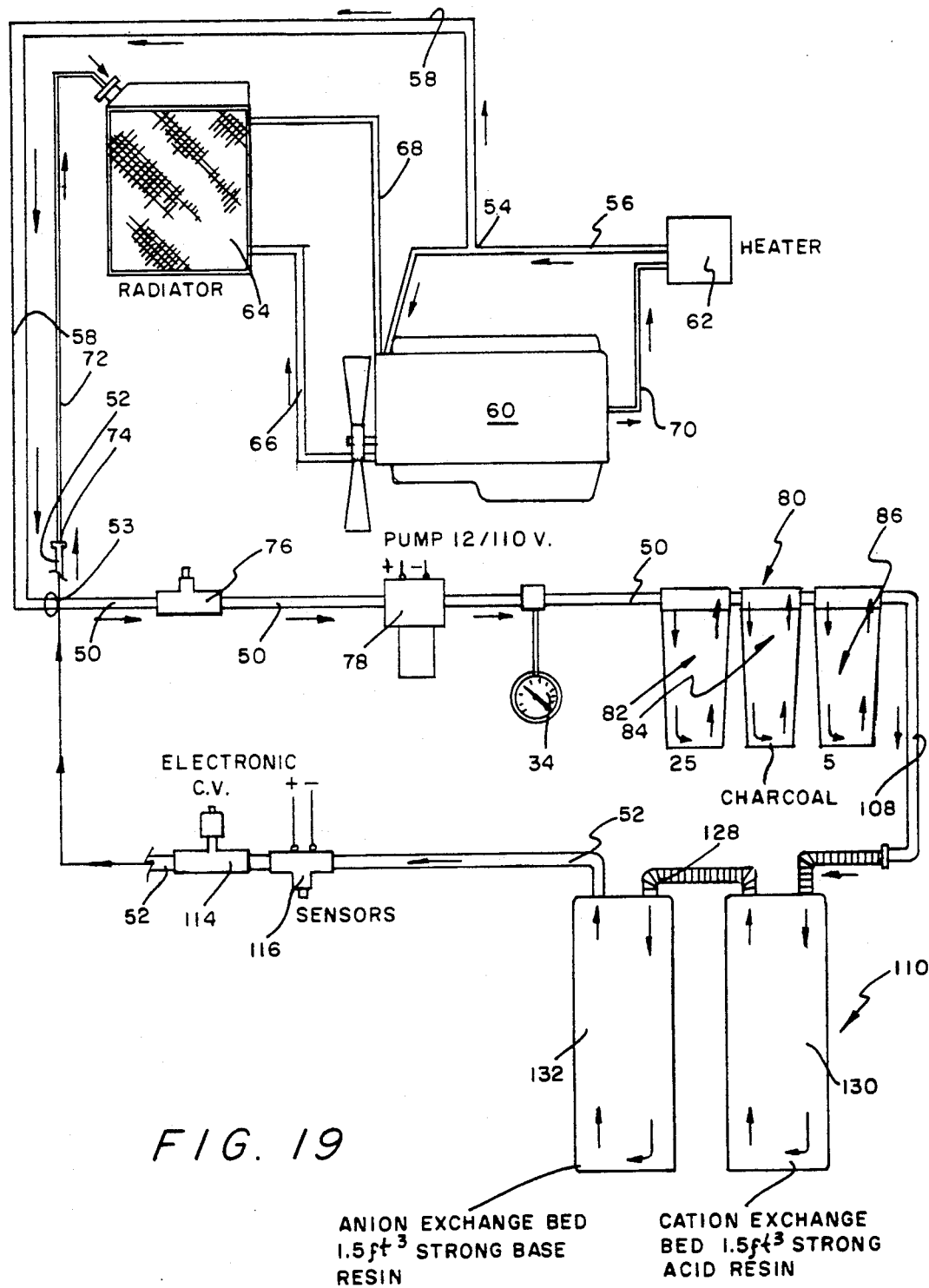
FIG. 19 is a full schematic view of one embodiment of the present invention.

The slanting face 20F has protruding therefrom an inlet conduit cap 46 and an outlet conduit cap 48 which respectively threadably engage an inlet conduit 50 and an outlet conduit 52 both of which pass through the slanted face 20F as best shown in FIG. 8. As also best shown in FIG. 8 and further best shown in FIG. 19, inlet conduit 50 has engaged thereto connection 53 which communicates with and is engaged to a conduit 58 that extends to a connection 54 advantageously located in a line 56. As shown in FIG. 19, line 56 extends from an engine block 60 to a heater 62 which is for use in a vehicle to be heated. Engine antifreeze coolant liquid (i.e., water and a freezing point depressant, such as ethylene glycol, etc.) is adapted to pass through cooling passages of an internal combustion engine cooling system that may be conveniently defined by the heater 62 and line 56; a radiator 64 and lines or hoses 66 and 68 which extend from the radiator 64 to the engine block 60; and a line 70 connecting the heater 62 with the engine block 60. Not shown in FIG. 19 is a coolant pump (i.e., a water pump) which may be conveniently located in line 66. During continued operation of the engine block 60, the engine antifreeze coolant liquid becomes contaminated with hydrocarbons (such as oil, grease, etc.), particulates [such as rust particles and precipitates (calcium/iron salts, etc.)]; dissolved anions (e.g. chloride, sulfate, nitrate, carbonate, bicarbonate, silicate, fluoride, nitrate, sulfite, hydroxide, etc.); and dissolved cations [e.g. calcium, magnesium, sodium, potassium, iron, manganese, copper, aluminum, barium, arsenic, lead, cadmium, mercury, silver, chromium, zinc, and hydronium (acid), etc.]. In the past, contaminated engine antifreeze coolant liquid would be either drained or dumped into sewer lines, or collected in drums and stored to be eventually collected by a hazardous waste collector. One of the salient features of the present invention is that such environmentally objectionable draining and storage is eliminated by cycling the contaminated engine antifreeze coolant liquid through the apparatus 10 of the present invention to remove undesirable particulates and hydrocarbons as well as deleterious anions (including nitrite anions) and cations. More specifically for one preferred embodiment of the invention, contaminated engine antifreeze coolant liquid may be provided by collecting it off the internal combustion engine cooling system from the line 58 at connection 53 and passed through the internals of the apparatus 10 for purification through removal of particulates, hydrocarbons (such as oil, grease, etc.), ions (i.e., anions and cations), and other contaminants. Purified and cleansed engine antifreeze coolant liquid is returned to radiator 64 through a line 72 that connects to outlet conduit 52 at connection 74. Connection 74 is a juncture where the line 72 and outlet conduit 52 are joined together such that the two communicate with each other. It is readily apparent that initially purified and cleansed engine antifreeze coolant liquid may be and will be recycled through the apparatus 10 for further purification and cleansing as long as the engine block 60 and/or a pump 78 (see FIGS. 19 and 23) of the apparatus 10 continually run. Pump 78 is any type of suitable pump, such as centrifugal, which is capable of taking a suction on a fluid for intaking the fluid, pumping the fluid and discharging the same at a desired location. In instances where the flow rate of the engine antifreeze coolant through the engine block 60 is vastly different, such as much higher, than the flow rate capable of being produced by the pump 78, it is recommended that the engine block 60 be secured from running and only the pump 78 be employed for causing the flow of engine antifreeze coolant liquid. More specifically further for another preferred embodiment of the invention and as previously indicated, the contaminated engine antifreeze coolant liquid may be collected or provided from drums (or other suitable containers) where it has been stored, passed through the internals of the apparatus 10 for purification and discharged back into the drums after purification. Such collection of engine antifreeze coolant liquid from drums may be advantageously obtained through a suction with pump 78 on the engine antifreeze coolant liquid situated in the drums. It is to be understood that the origin of the engine antifreeze coolant liquid to be provided and furnished to the apparatus 10 may be of any origin or genesis; and the present invention is not to be limited by the origin or genesis of the engine antifreeze coolant liquid.

Figure 17:
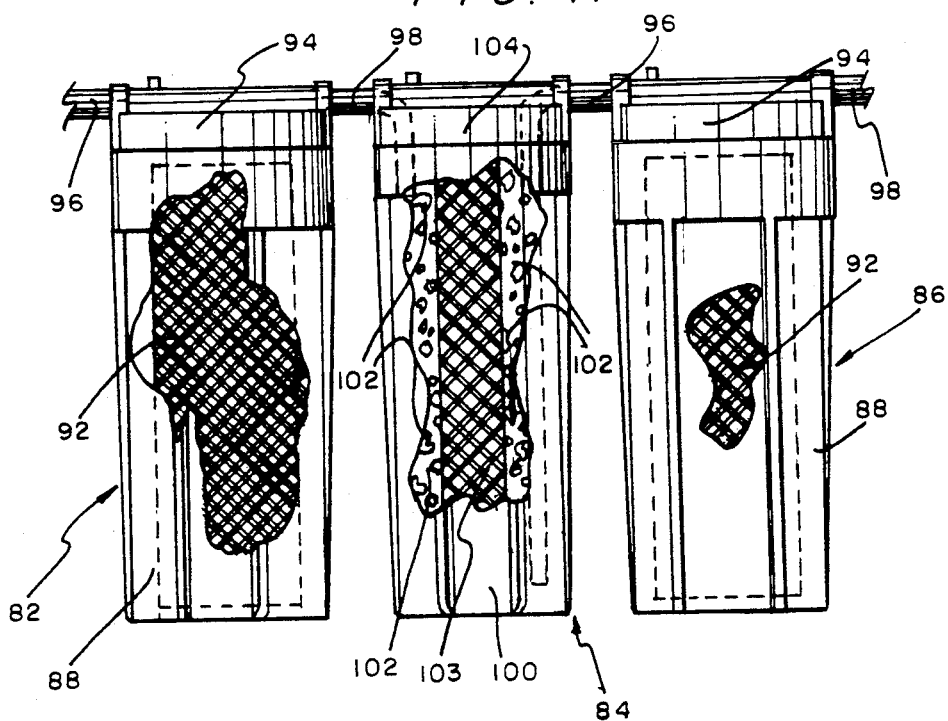
FIG. 17 is a side elevational view of the three in line filters with the insides partial shown to expose the inside of each filter.
Figure 18:
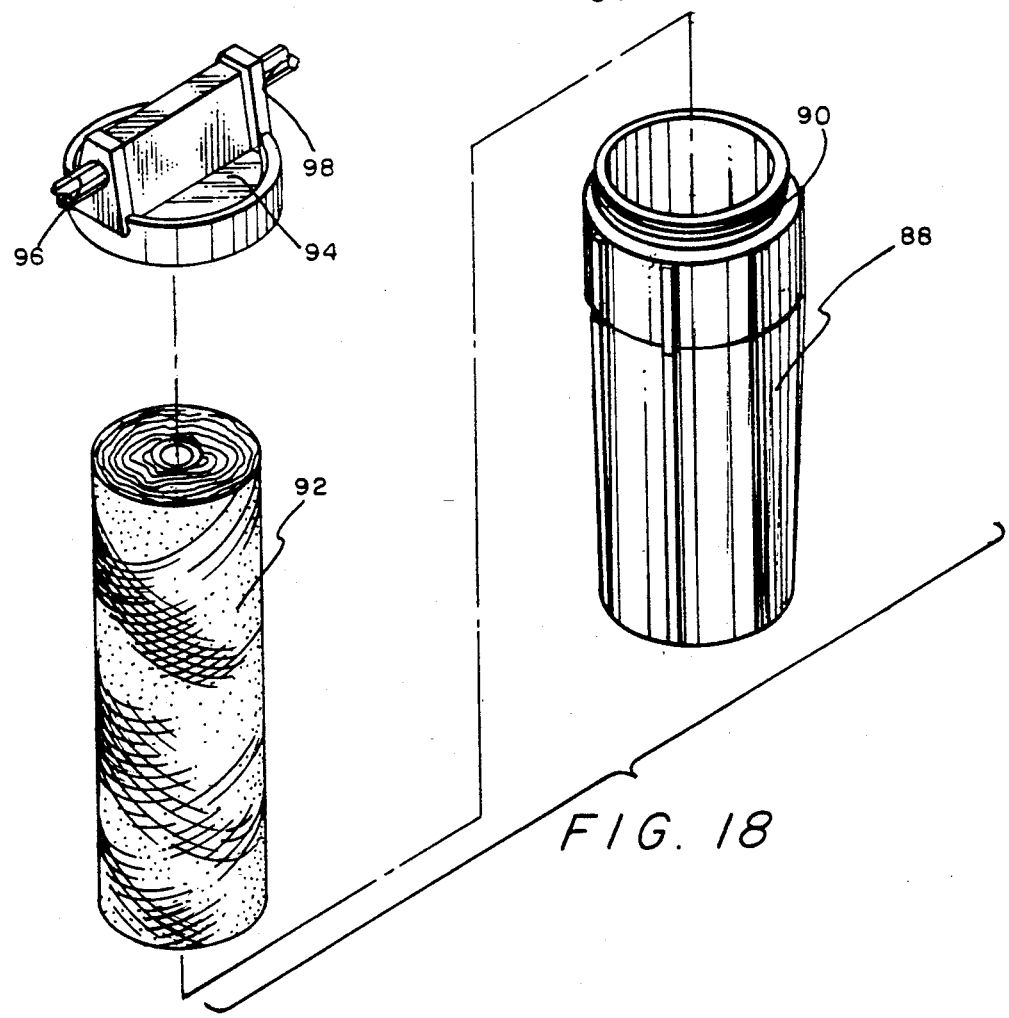
FIG. 18 is a segmented perspective view of one of the mechanical filters showing the filter container, the spun filter and the top which is to be threadably engaged to the threaded neck of the filter container.

The apparatus 10 is provided with a valve 76 (e.g. a check valve) and the pump 78, all disposed advantageously in inlet conduit 50 to communicate with the contaminated engine antifreeze coolant liquid. Valve 76 is a typical back pressure type check valve which is to prevent flow-back of contaminated engine antifreeze coolant. Pump 78, as was previously mentioned, is for causing the flow of contaminated engine antifreeze coolant from a given source, and for pumping or transferring the received contaminated engine antifreeze coolant liquid through the remaining internals of the apparatus 10, and through outlet conduit 52. For the embodiment of the invention in FIGS. 19 and 23, outlet conduit 52 returns purified engine antifreeze coolant liquid into line 72 for disposition back into the radiator 64. Further for the embodiment of the invention in FIGS. 19 and 23, the contaminated engine antifreeze coolant liquid may be caused to be flowed from line 56, through the line 58 and into the inlet conduit 50 by a running engine block 60 (and a coolant pump not shown in the drawings). As was previously mentioned, it is not necessary for the engine block 60 to be running, as suction from the pump 78 alone is sufficient to cause the engine antifreeze coolant liquid to flow. Also disposed advantageously in inlet conduit 50 is the pressure gauge 34 extending therefrom to be exposed on and from the slanted face 20F. Inlet conduit 50 terminates in a filtering system, generally illustrated as 80, where precipitated particles as well as other particulates are to be removed along with any associated hydrocarbons. The filtering system 80 may be any filtering system capable of functioning to remove and/or filter out hydrocarbons and particles contained within the contaminated engine antifreeze coolant liquid. Preferably, for the embodiment of the invention in FIG. 19, the filtering system 80 comprises a series of three (3) in line filters, identified as 82, 84 and 86 in FIGS. 19 and 23, that employ both mechanical and active chemical (absorption) filtration. More preferably, there are two (2) mechanical filters and one (1) active chemical filter. The two (2) mechanical filters are preferably filters 82 and 86 and the active chemical filter is filter 84. In a preferred embodiment of the invention, each mechanical filter includes a filter container 88 having a threaded neck 90 (see FIG. 18). Removably disposed in the filter container 88 is a line or spun filter 92 such as the type purchased under the product numbers CU25WOT and SW05T of the Filter Cor Co. Each line of the spun filter 92 may be manufactured from any suitable material, such as nylon or cotton, or the like. The spun filters 92—92 are maintained in their respective filter container 88 by a top 94 that threadably engages the threaded neck 90 of the filter container 88. Each top 94 (as best shown in FIG. 18) is pierced by an inlet filter conduit 96 and an outlet filter conduit 98, both communicating with the inside of each filter container 88 such that the engine coolant liquid (which is to be filtered) can pass into the filter container 88 and out of same after being filtered by spun filter 92. Inlet filter conduit 96 is in direct communication with inlet conduit 50, and outlet filter conduit 98 is communicatively engaged to an intermediate conduit identified as "108" below. Each spun filter 92 is produced to be capable of filtering out certain size particles and/or particulates, which may be of any preferred size, depending on the desired results. Preferably, the spun filter 92 in filter 82 possesses the capabilities of filtering out particulates having a particle size of 25 microns or larger; and likewise, the spun filter 92 in filter 86 can remove and/or filter out from the engine antifreeze coolant liquid particulates having a particle size of 5 microns or larger. The 25 micron size spun filter 92 in filter 82 initially removes the larger particles entrained in the engine antifreeze coolant liquid with the 5 micron size spun filter 92 in filter 86 subsequently removing the smaller particles entrained in the engine antifreeze coolant liquid along with the larger particles that were not filtered by and by-passed the 25 micron size spun filter 92 in filter 82. The active chemical (adsorption) filter 84 is straddled by the two (2) mechanical filters 82 and 86 and functions to remove any of the hydrocarbons as well as other chemicals that are contained in the engine antifreeze coolant liquid. In a preferred embodiment of the invention, the active chemical filter 84 comprises a filter container 100 which holds activated carbon, such as in the form of particulate charcoal 102 (see FIG. 17) In a more preferred embodiment of the invention as best shown in FIG. 17, a filtering member 103, which is preferably any mechanical filter means for filtering such as a strainer or a screen or spun filter 92, is generally coaxially, concentrically disposed in the filter container 100 with the particulate charcoal 102 surrounding the filtering member 103. Preferably, the filtering member 103 possesses the capabilities of removing and/or filtering out from the engine antifreeze coolant liquid particulates having a particle size of 5 microns or larger. The activated carbon particulate of this invention is an amorphous form of carbon characterized by high adsorptivity for many hydrocarbons, chemicals, and colloidal solids. The carbon is obtained by the destructive distillation of carbonaceous materials (such as animal bones, nut shells and wood); and is "activated" by heating at a temperature of 800°–900° C. with steam and/or carbon dioxide, resulting in an internal structure defined with porosity (i.e., honeycomb-like). The internal surface area of the activated carbon of this invention may be of any particulate size, such as from about 70 $m^2/g$ to about 2000 $m^2/g$ and with a specific gravity of from about 0.08 to about 0.5. Preferably the activated carbon is 12×40 mesh with a surface area of about 600 $m^2/g$ and a specific gravity of 0.1 to 0.4. As previously indicated, the filter container 100 preferably has the filtering member 103 and the particulate charcoal 102 surrounding the filtering member 103, as illustrated in FIG. 17. The filter container 100 for the activated carbon also has a threaded neck (not shown in the drawings) similar to neck 90 of filter container 88 for threadably engaged with a top 104. As further best shown in FIG. 17, top 104 has a pair of opposed openings, with one of the opposed openings receiving the outlet filter conduit 98 from filter 82 to emit engine antifreeze coolant liquid that has been filtered by filter 82, and with the other opposed opening receiving the inlet filter conduit 96 of the filter 86 to exit engine antifreeze coolant liquid that has been filtered by the activated carbon in the chemical filter 84.

Figure 23:
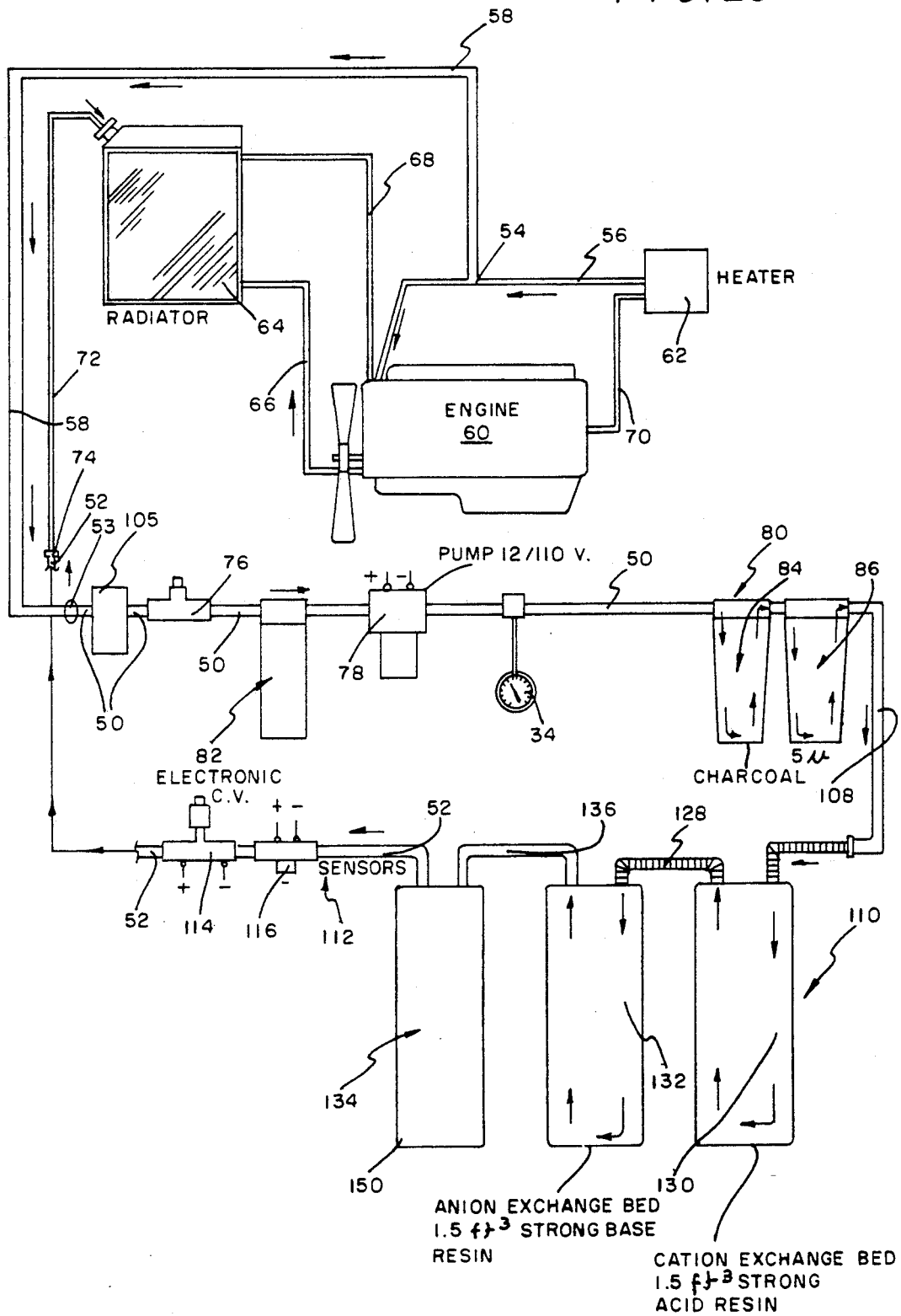
FIG. 23 is a full schematic view of another embodiment of the present invention.

In the preferred embodiment of the invention in FIG. 23, filter 82 is positioned in front of pump 78 in order to initially remove or filter out the particulates having a certain particle size, preferably 25 microns or larger. Such disposition of filter 82 provides for removal of larger particulates from the engine antifreeze coolant liquid before passing through pump 78. Particulates of the preferred 25 microns in size or larger could clog or plug the pump 78, especially if the particulates agglomerate. Thus, in this embodiment of the invention, the filtering system 80 is split or severed, with filter 82 being disposed in front of pump 78 and gauge 34, and with filters 84 and 86 being positioned downstream from pump 78 and gauge 34. Inflowing contaminated engine antifreeze coolant liquid flows into filter 82 where at least part of the particulates of the preferred 25 micron size or larger is removed through initial filtration. From filter 82, the initially filtered engine antifreeze coolant liquid passes to pump 78 for pumping and transferring into the filter 84 where hydrocarbons and other chemicals can be filtered or otherwise removed from the engine antifreeze coolant liquid. From filter 84 the engine antifreeze coolant liquid passes into filter 86 where particulates of a smaller size, say preferably 5 microns or larger, can be removed from the engine antifreeze coolant liquid. After the smaller size particulates have been removed, the engine antifreeze coolant liquid passes into an intermediate conduit (identified below as "108"). Further with respect to the preferred embodiment of the invention in FIG. 23, a heat exchanger 105 (or any cooler member) is disposed between connection 53 and valve 76 to cool incoming engine antifreeze coolant to a lower temperature, preferably to 120° F. or lower, to prevent damage to any of the internal components of the apparatus 10, especially those that may be sensitive to heat. Heat exchanger 105 may be any type of heat exchanger or cooler, preferably of the type having the cooling medium being self-contained.

The mechanical filters 82 and 86 having spun filters 92—92 remove suspended solids and/or gross contaminants from engine antifreeze coolant liquid while the chemical filter 84 (or activated carbon/charcoal 102, or the activated particulate charcoal 102 in combination with the filtering member 103) assist in removing entrained hydrocarbons (e.g. solvents, oils, surfactants, and degradation products, such as organic acids). The functionality of the activated carbon is very important because as ethylene glycol oxidizes in service, various low molecular weight organic acids are produced. Furthermore, chemicals employed to flush radiators often contain solvents, surfactants, and acids, such as citric acid. All of these deleterious chemicals, hydrocarbons and substances can be absorbed when using the correct activated carbon (or the correct activated carbon in combination with filtering member 103) in filter 84 and utilizing the proper flow rate through the filter 84. In a more preferred embodiment of the present invention the activated carbon to be employed is granular in form, 12×40 mesh, with an internal surface area of 600 $m^2/g$, and sold under the trademark DARCO, a trademark of the American Norit Co. The preferred flow rate for pump 78 to pump engine coolant liquid through the internals of the apparatus 10 including the filtering system 80 is from about 1 to about 10 gallons per minute. While the preferred mechanical filters 82 and 86 are of the spun filter type with respective sizes being 25 microns and 5 microns, it should be understood that the spirit and scope of the present invention encompasses any type of mechanical filters possessing any suitable size, provided that any undesirable suspended particles can be removed. Similarly, while the preferred chemical filter 84 is of the active chemical (adsorption) type, more specifically activated carbon or charcoal, it should be understood that the spirit and scope of the present invention also encompasses any type of chemical filter that is capable of removing deleterious hydrocarbons and chemicals, such as, by way of example only, the particulate charcoal 102 in combination with the filtering member 103.

The apparatus 10 additionally comprises an intermediate conduit 108 extending from the filtering system 80, more specifically from filter 86, to an ion exchange zone, generally illustrated as 110, wherein deleterious ions (i.e., anions and cations) contained within the engine antifreeze coolant liquid are removed. The ion exchange zone 110 is one of the salient features of the present invention and has a number of preferred embodiments, each of which will be explained in detail below. After deleterious ions have been removed from the engine antifreeze coolant liquid in the ion exchange zone 110, the engine coolant liquid leaves the ion exchange zone 110 and passes into the outlet conduit 52, as best shown in FIG. 19. As further best shown in FIG. 19 and more particularly in FIG. 15, the outlet conduit 52 between connection 74 and the ion exchange zone 110 has a sensoring zone, generally illustrated as 112, and an electronic valve 114 disposed advantageously therein such that the engine antifreeze coolant liquid may pass therethrough before being discharged from conduit 52, such as for flowing through line 72 and back into the radiator 64. In a preferred embodiment of the present invention, the sensing zone 112 includes the indicator 42, and measures and indicates the conductivity of the engine antifreeze coolant liquid, as a measure of the degree of purification of the engine antifreeze coolant liquid.

Figure 10:
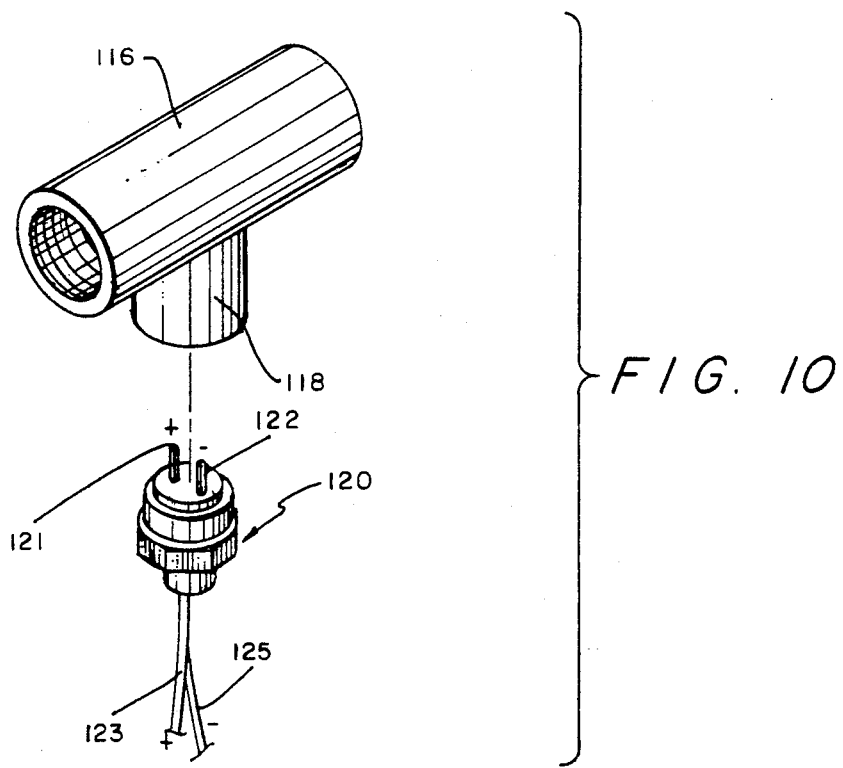
FIG. 10 is a segmented perspective view disclosing a T-fitting wherein a conductivity probe is housed for contacting engine coolant liquid such that its resistance and/or conductivity can be gauged and monitored.
Figure 11:
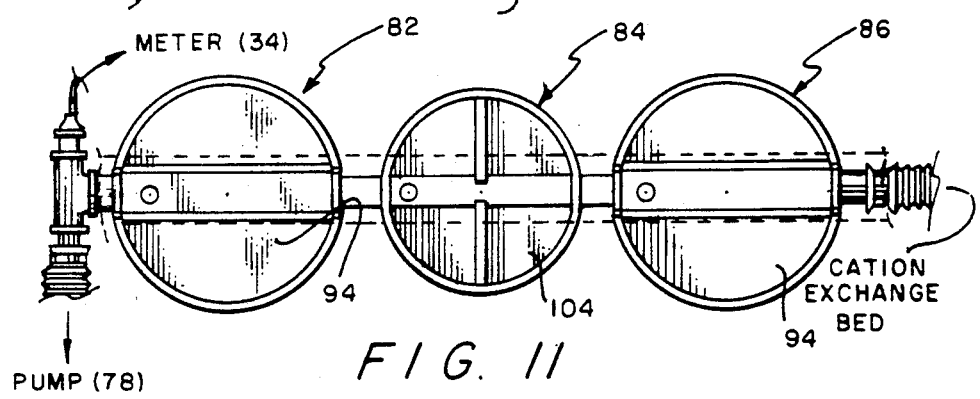
FIG. 11 is a top plan view of the three (3) in line filters disposed in series.
Figure 12:
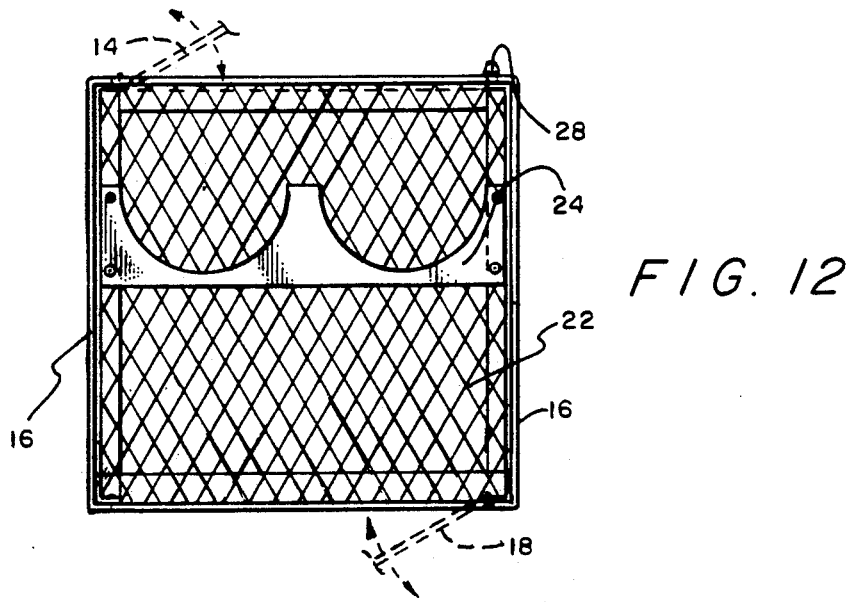
FIG. 12 is a horizontal sectional view taken in direction of the arrows and along the plane of line 12—12 in FIG. 8.

When the engine antifreeze coolant liquid leaves the ion exchange zone 110 and passes into the sensing zone 112 via outlet conduit 52, the sensing zone 112 continually monitors the resistivity and/or conductivity of the engine antifreeze coolant liquid as a measure of the effectiveness of the ion exchange zone 110 in removing ions. Should the ion exchange zone 110 become defective and cease to remove contaminating ions from the contaminated engine antifreeze coolant liquid, the resistivity of the engine antifreeze coolant liquid after it passes through the ion exchange zone 110 will decrease below a predetermined, preferred value (e.g. 20,000 ohms) and the indicator 42 alerts the operator (such as becoming lit if indicator 42 is a light) that a sufficient quantity of deleterious ions has not been removed by the ion exchange zone 110. Stated alternatively, if the ion exchange zone 110 becomes exhausted and can no longer effectively remove deleterious ions from a contaminated engine antifreeze coolant liquid, the conductivity of the engine antifreeze coolant liquid leaving the ion exchange zone 110 will increase to a predetermined, preferred value (e.g. 50 micromhos) and the indicator 42 will signal that the engine antifreeze coolant liquid is not being purified of contaminating ions by the ion exchange zone 110 to a desired degree of purification. In such situations the ion exchange zone 110 typically has to be replenished with effective ion exchanger(s). Furthermore, with respect to a preferred embodiment of the present invention, the sensing zone 112 additionally comprises at least one T-fitting 116 (see FIG. 10) advantageously positioned in outlet conduit 52 before valve 114 and after the ion exchange zone 110. T-fitting 116 has a neck 118 wherethrough a probe, generally illustrated as 120, removably passes and lodges. The probe 120 is formed with a pair of prongs 121 and 122 which contacts the engine antifreeze coolant liquid as it passes through the T-fitting 116. Prong 121 has conveniently been labeled as the positive (+) terminal with conductor 123 extending therefrom. Similarly, prong 122 has conveniently been labeled as the negative (−) terminal with conductor 125 extending therefrom. The indicator 42 (i.e., the resistance instrument) and the probe 120 (i.e., the electrode cell) are formed and calibrated such that the conductivity or resistance of the indicator 42 (more specifically, the indicator light 42) is matched with the conductivity or resistance of the probe 120. Direct current is continually being sent to the negative terminal prong 122 from a power source. If the engine antifreeze coolant liquid possesses a predetermined resistance and conductivity after passing through the ion exchange zone 110, direct current will pass from the negative terminal prong 122, through the engine antifreeze coolant liquid, and through the positive terminal prong 121, closing a circuit (including the indicator 42) with a power source. When the circuit is closed, the indicator 42 is energized to alert the operator that the ion exchange zone 110 is not removing the contaminating ions and the engine antifreeze coolant liquid is still contaminated. If the ion exchange zone 110 is operating effectively, the engine antifreeze coolant liquid leaving the ion exchange zone 110 possesses a degree of purification and a high enough resistivity (or a low enough conductivity) that direct current can not flow through the engine antifreeze coolant liquid from the negative terminal prong 122 and the indicator 42 will not be energized and remains dormant. As long as the indicator 42 is not energized and not activated, the engine antifreeze coolant liquid leaving the ion exchange zone 110 possesses a desired degree of purification and a resistivity (or a conductivity) that direct current does not pass from the negative terminal prong 122, through the engine antifreeze coolant liquid, and through the positive terminal prong 121. The probe 120 including the prongs 121-122 and the respective disposition (i.e., spacing) of same are calibrated such that with a given, predetermined current and voltage across the prongs 121-122 and a certain resistivity (or conductivity) in the engine antifreeze coolant liquid, direct current will flow from the negative terminal prong 122, through the engine antifreeze coolant liquid, and through the positive terminal prong 121. Preferably, the probe 120 (including the prongs 121-122) is calibrated such that at 12 volts across the prongs 121-122 the indicator 42 as a light will illuminate if the resistivity of the engine antifreeze coolant liquid falls and decreases to (or below) 20,000 ohms or the conductivity increases to (or above) 50 micromhos. As the parts per million (ppm), or grains per gallon (gpg), of ionic particles in the engine antifreeze coolant liquid increases such that the engine antifreeze coolant liquid does not possess a desired degree of ion purification, the resistivity of the engine antifreeze coolant liquid between the prongs 121-122 has decreased and the conductivity has increased. Thus, the sensing zone 112 of the present invention continually monitors the resistivity (or conductivity) of the engine antifreeze coolant liquid leaving the ion exchange zone 110, as a measure of the degree of purification of the engine antifreeze coolant liquid and as a measure of the effectiveness of the ion exchange zone 110 in removing contaminating ions. If the ion exchange zone 110 becomes ineffective, the ion exchanger(s) (which will be identified hereinafter) in the ion exchange zone 110 should be replaced and/or otherwise replenished.

The ion exchange zone 110 is a typical ion exchange which may be defined as a reversible chemical reaction between a solid (ion exchanger) and a fluid (usually a water solution) by means of which ions may be interchanged from one substance to another. The superficial physical structure of the solid, or the ion exchanger, is not affected. Typically, a fluid, such as engine antifreeze coolant liquid, is passed through a bed of the solid/ion exchanger which is in the form of ion exchange synthetic resins with active groups. Ions on the resin are exchanged with ions in the liquid. In the present invention, predetermined ions on the resins are exchanged with the ions (i.e., cations and anions) in the engine antifreeze coolant liquid.

The ion exchange zone 110 has a number of preferred embodiments. In the preferred embodiment of the invention in FIG. 21, the ion exchange zone 110 comprises a pair of mixed bed ion exchangers 124 and 126, each having a mixture of anion and cation exchange resins. The two ion exchangers 124 and 126 are interconnected by conduit 128. A zone for separating or a separator, generally illustrated as 134, is engaged communicatively with the mixed bed ion exchanger 126 via conduit 136 in order to receive the engine antifreeze coolant liquid after it leaves mixed bed ion exchanger 126 to remove nitrogen containing compounds (such as gas containing nitrogen and selected from the group consisting of nitric oxide, nitrogen dioxide, and mixtures thereof) that may have formed in mixed bed ion exchangers 124 and/or 126. How nitrogen containing compounds (such as nitrogen containing gas) form in ion exchangers, and in particular cation-ion exchangers, will be explained in greater detail below.

Figure 22:
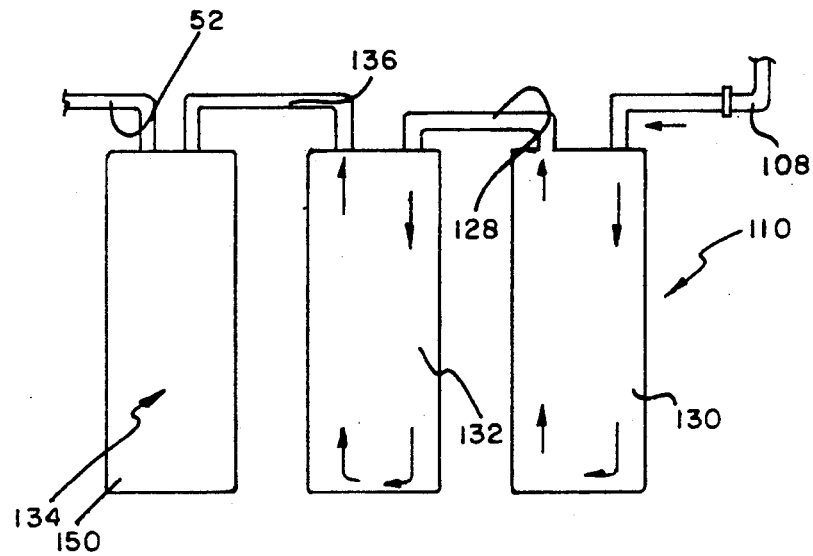
FIG. 22 is a partial schematic view of yet another embodiment of the present invention.

In a more preferred embodiment of the present invention, the ion exchange zone 110 comprises a cation exchange bed ion exchanger 130, and an anion exchange bed ion exchanger 132 in communication with the cation exchange bed ion exchanger 130 by the conduit 128, as best depicted in FIG. 19. In another more preferred embodiment of the present invention, as best shown in FIG. 22, the ion exchange zone 110 comprises the cation exchange bed ion exchanger 130 and the anion exchange bed ion exchanger 132 in communication with the cation exchange bed ion exchanger 130 via the conduit 128, and the separating zone 134 wherein compounds containing nitrogen [i.e., $NO_{(g)}$ (nitric oxide) and/or $NO_{2(g)}$ (nitrogen dioxide)] are removed from the engine antifreeze coolant liquid after it leaves the anion exchange bed ion exchanger 132 through the conduit 136 that intercommunicates the separating zone 134 with the anion exchange bed ion exchanger 132. The nitrogen-containing compounds, such as nitrogen containing gas selected from nitric oxide and/or nitrogen dioxide, initially form in the cation exchange bed ion exchanger 130 and perhaps continue to form through a series of decomposition and reactions in the anion exchange bed ion exchanger 132 as more particularly explained below. One of the salient features of the present invention is the removal of nitrogen-containing compounds (especially deleterious nitrogen-containing gas) from the engine antifreeze coolant liquid after it leaves the anion exchange bed ion exchanger 132.

After the engine antifreeze coolant liquid leaves the ion exchange zone 110, more specifically the separating zone/separator 134, it passes via conduit 52 through the sensing zone 112 wherein the degree of purification of the engine antifreeze coolant liquid is being monitored in accordance with the procedure previously described. From the sensing zone 112 the engine antifreeze coolant liquid passes via outlet conduit 52 through the valve 114 and continues through outlet conduit 52 for eventual discharge through connection 74 into another line, such as line 72. After the engine antifreeze coolant liquid has been purified to a desired level, the engine antifreeze coolant liquid typically comprises an aqueous coolant (i.e., water) and ethylene glycol (if a freezing point depressant was initially employed). Essentially all oils/greases (i.e., hydrocarbons), particulates (e.g. rust particles), cations and anions have been removed, including any and all inhibitors and other additives that were previously contained in the engine antifreeze coolant liquid before passing through the apparatus 10 for purification. These inhibitors and additives, which are to be added back into purified engine antifreeze coolant liquid before it is employed for further use, may include any types of inhibitors and additives including (depending on the use of the engine antifreeze coolant liquid) conventional scale inhibitors (e.g. tetrasodium pyrophosphate and polyacrylates having a molecular weight less than 5000), corrosion inhibitors, microbrocides (e.g. halogens, quarternary amines, methylene bis thiocyanate, tributyltin oxide, etc.), antifoaming agents, dyes, and/or iron dispersants, etc. The addition of inhibitors and other additives may be performed at any suitable location such as outside apparatus 10 or merely modifying outlet conduit 52 such that the inhibitors/additives may flow into outlet conduit 52 as the purified engine antifreeze coolant liquid is flowing therethrough to leave the apparatus 10. In a preferred embodiment of the present invention, the origin of the engine antifreeze coolant liquid is from the cooling system of an automobile, truck, tractor or any other vehicle; and thus, will always include corrosion inhibitors for various dissimilar metals from which the cooling system (including the engine) is manufactured, such as copper, brass, aluminum, solder, steel, and cast iron.

Figure 20:
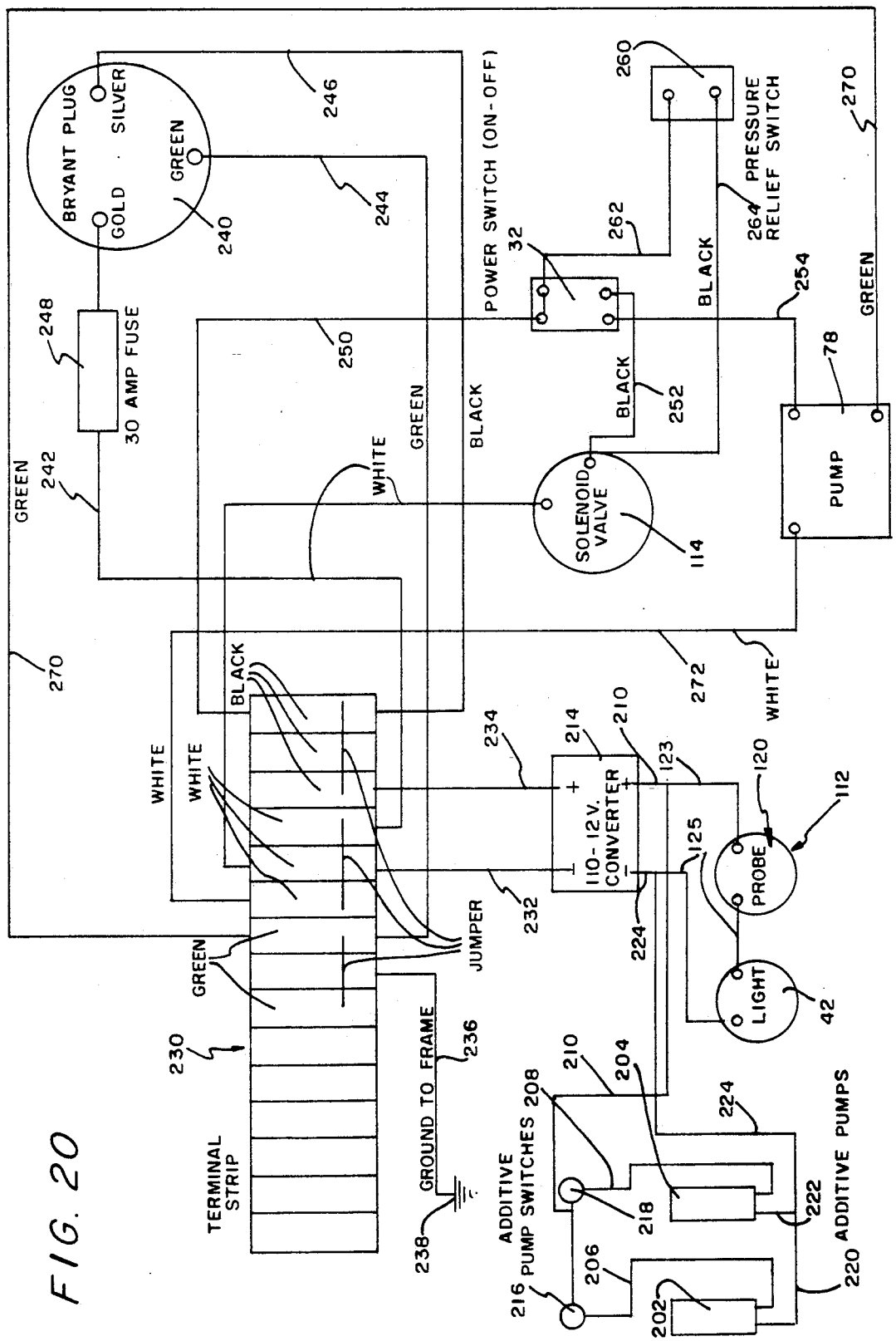
FIG. 20 is an electrical schematic diagram for one embodiment of the present invention wherein the power source is a 110 volt power source as opposed to a 12 volt power source (i.e., the battery of a car)

In the electrical schematic in FIG. 20 for a 110 volt power source as opposed to a 12 volt source (i.e., the battery of a car), the apparatus 10 includes a pair of inhibitor additive pumps 202 and 204 which respectively have conductors 206 and 208 leading to a conductor 210 that in turn leads to a 110 volt to 12 volt converter 214. Conductors 206 and 208 respectively have additive pump switches 216 and 218 for energizing the pumps 202 and 204. Pumps 202 and 204 also have conductors 220 and 222 leading respectively therefrom to a conductor 224 that electrically engages the 110 volt to 12 volt converter 214. Conductors 210 and 224 are electrically engaged to the sensing zone 112; more specifically, to the conductors 123 and 125 which electrically interconnect respectively conductor 210 with conductor 224. As illustrated in FIG. 20, indicator light 42 is electrically in series in conductor 125 which electrically engages probe 120 along with conductor 123. Leading from the converter 214 to a terminal strip, generally illustrated as 230, are conductors 232 and 234. A ground conductor 236 leads from the terminal strip 230 to a ground 238. Also leading from the converter 214 to a plug or receptacle 240 (which may be conveniently mounted on the cabinet 12 of the apparatus 10) are conductors 242, 244 and 246. Conductor 242 conveniently has a 30 amp fuse 248. A cord (not shown in the drawings) extends from the receptacle or plug 240 to a 110 volt power source. The cord is preferably equipped with a Ground Fault Interrupter (not shown in the drawings) to provide protection to the operator. Extending from the terminal strip 230 to the on/off switch 32 (i.e., the power switch) is conductor 250. The on/off switch 32 is electrically engaged to valve 114 and pump 78 by conductor 252 and 254 respectively. A pressure relief switch 260 is respectively electrically engaged to on/off switch 32 and to valve 114 by conductors 262 and 264. Pump 78 is electrically connected to the terminal strip 230 by conductors 270 and 272. In operation, power (e.g. 110 volt power) is supplied to the plug 240 by the cord (not shown in the drawings), and is distributed to the terminal strip 230 via conductors 242, 244 and 246. The terminal strip 230 is protected by the 30 amp overload fuse 248 and is grounded to ground 238 by conductor 236. When the on/off switch 32 is turned on, power is provided to valve 114 and pump 78. When valve 114 receives power, it is opened and engine antifreeze coolant liquid is permitted to flow through inlet conduit 50, through the filtering system 80, through intermediate conduit 108 and the ion exchange zone 110, and through the separating zone 134 and into the outlet conduit 52 for passage through the sensing zone 112 and the valve 114 itself. When pump 78 receives the power, the engine antifreeze coolant liquid is caused to flow as such and is further caused to be pumped from the cooling system of a vehicle or from any other source, such as drums (not shown in the drawings). Turning the on/off switch 32 to "off" closes the valve 114 and deenergizes the pump 78, all of which stops and prevents the flow of engine antifreeze coolant liquid. Turning the pressure relief switch 260 to an "on" position without turning on the on/off switch 32 opens the valve 114 without activating the pump 78; thus allowing the operator to relieve pressure within the internals of the apparatus 10 for any desired purpose, such as for changing the deionization container (e.g. a cation exchange bed ion exchanger and/or an anion exchange bed ion exchanger, all of which will be identified hereinafter). When the pressure relief switch 260 and the on/off switch 32 are turned "off", the valve 114 closes. The terminal switch 230 transmits the power to the converter 214 which converts 110 volts to 12 volts. The converter 214, when turned on, supplies 12 volt power and direct current to the inhibitor additive pumps 202 and 204 when the additive pump switches 216 and 218 are pushed to the "on" position. The switches 216 and 218 are preferably spring loaded to return to the "off" position. The converter 214 also supplies 12 volt power and direct current to the probe 120 and the indicator light 42.

The corrosion inhibitors for the present invention preferably include film forming polar organic materials such as MBT (mercaptobenzothiazole); divalent cations such as $Zn^{-2}$; anions such as molybdate and phosphate; and certain sodium and/or potassium salts. More preferable, the corrosion inhibitor(s) of the present invention is selected from the group consisting of sodium tetraborate ($Na_2B_4O_7.5H_2O$); sodium metasilicate ($Na_2SiO_3.5H_2O$); sodium nitrate ($NaNO_3$); sodium nitrite ($NaNO_2$); sodium mercaptobenzothiazole (NaMBT); sodium tolyltriazole ($C_7H_6N_3Na$); disodium monohydrogen phosphate ($Na_2HPO_4.7H_2O$); sodium molybdate ($Na_2MoO_4.2H_2O$); and mixtures thereof.

In a preferred embodiment, the corrosion inhibitors and additives of the present invention to be admixed with the engine antifreeze coolant liquid are formulated into a pair of additive mixtures (or additive packages) for automotive purposes; and a pair of additive mixtures (or additive packages) for heavy duty motor purposes. The automotive inhibitor and additives packages comprises preferably a first mixture (which may be identified as 5502A) preferably comprising a major amount of an aqueous phosphate solution; and a minor amount of an antifoam agent, preferably polyoxypropylene-polyoxyethylene block copolymer, available commercially under the product name of Pluronic L61 from BASF Corp.; and a dye, preferably CI Acid Blue 9, Disodium salt ($C_{37}H_{34}N_2S_3Na_2$) available commercially under the product name of Cobratec Colorant 0950; and a second mixture (which may be identified as 5502B) preferably comprising a major amount of various inorganic and organic corrosion and scale inhibitors in an aqueous medium; and a minor amount of an antifoam agent, preferably polyoxypropylene-polyoxyethylene block copolymer, available commercially under the product name of Pluronic L61 from BASF Corp.; and a dye, preferably Dipotassium Fluorescein, Acid Yellow 73 ($C_{20}H_{10}O_5K_2$) available commercially under the product name Cobratec Colorant 7335. The 5502A mixture and the 5502B mixture of the automotive package are preferably combined in a ratio of from about 1:0.5 to about 1:1.5 by wt., more preferably in a ratio of 1 to 1 by wt. The combined 5502A mixture and 5502B mixture are to be added to the purified engine antifreeze coolant liquid such that the new, "rejuvenated" engine antifreeze coolant liquid comprises a sufficient quantity of the combined 5502A and 5502B mixture. The two dyes may be of any suitable color, preferably diverse in color such that when combined by the automotive package being added to the purified engine antifreeze coolant liquid which is basically clear and colorless, the new, "rejuvenated" engine antifreeze coolant liquid has a known coloration to provide a means for ensuring that both the 5502A mixture and the 5502B mixture are indeed present and that the purified engine antifreeze coolant liquid has been properly treated with the required inhibitors and additives to fully protect cooling system (including the engine) of the automotive vehicle that is to receive the new, "rejuvenated" engine antifreeze coolant liquid. In a preferred embodiment of the invention, the dye for the 5502A mixture is blue in color so that the 5502A mixture is also blue in color, and the dye for the 5502B mixture is yellow in color to give the 5502B mixture a yellow color. When the blue 5502A mixture is mixed with the yellow 5502B mixture, the completed engine antifreeze coolant liquid has a blue-/green coloration, ensuring that both additive mixtures are present.

The heavy duty inhibitor and additive package (particularly useful for diesel machinery such as trucks and the like) comprises preferably a first mixture (identified as 5702A) comprising a major amount of an aqueous phosphate solution; and a minor amount of an antifoam agent, preferably polyoxypropylenepolyoxyethylene block copolymer, available commercially under the product name of Pluronic L61 from BASF Corp.; and a dye, preferably CI Acid Blue Disodium salt ($C_{37}H_{34}N_2S_3Na_2$) available commercially under the product name of Cobratec Colorant 0950; and a second mixture which may be identified as 5702B preferably comprising a major amount of various inorganic and organic corrosion and scale inhibitors in an aqueous medium; and a minor amount of an antifoam agent, preferably polyoxypropylenepolyoxyethylene block copolymer, available commercially under the product name of Pluronic L61 from BASF Corp., and a dye, preferably Dipotassium Fluorescein, Acid Yellow 73 ($C_{20}H_{10}O_5K_2$) available commercially under the product name Cobratec Colorant 7335. The 5702A mixture and the 5702B mixture of the heavy duty package are preferably combined in a ratio of from about 1:0.5 to about 1:1.5 by wt., more preferably in a ratio of 1 to 1 by wt. The combined or admixed 5702A mixture and 5702B mixture for the heavy duty package are to be added to the purified engine antifreeze coolant liquid such that the new, "rejuvenated" engine antifreeze coolant liquid for heavy duty machinery comprises a sufficient quantity of the combined 5702A and 5702B mixture for the heavy duty inhibitor/additive package. Similar for the two dyes of the automotive inhibitor/additive package, the two dyes in the heavy duty inhibitor/additive package may be of any suitable color, preferably diverse in coloration such that when combined by the heavy duty package being added to the purified engine antifreeze coolant liquid, the new, "rejuvenated" engine antifreeze coolant liquid for heavy duty use has a known coloration, providing a failsafe means for ensuring that the new, "rejuvenated" engine antifreeze coolant liquid for heavy duty use has been properly treated with the appropriate inhibitors and additive to protect the cooling system and the engine of the heavy duty vehicle that is to receive the new, "rejuvenated" heavy duty engine antifreeze coolant liquid. In a preferred embodiment of the invention, the two dyes employed in the heavy duty package are of identical, diverse color as the two dyes employed in the automotive package. More specifically, the dye for the 5702A mixture has a blue color and the dye for the 5702B mixture has a yellow color such that the completed engine antifreeze coolant liquid for heavy duty use has a blue/green coloration, again ensuring that both additive mixtures are present. Thus, another one of the salient features of the present invention is the providing of a first inhibitor/additive mixture of a first known color; the providing of a second inhibitor/additive mixture of a second known color different in color from the first known color; and adding the first inhibitor/additive mixture and the second inhibitor/additive mixture to a purified engine antifreeze coolant liquid such that the admixture of the engine antifreeze coolant liquid/first mixture/second mixture obtains and/or results in a known color. The resulting known color of the admixture is indicative of the fact that the engine antifreeze coolant liquid has been properly treated to protect the cooling system of an engine from corrosion, and etc. More particularly, the resulting known color ensures that the necessary inhibitors/additives are present to re-inhibit the purified engine antifreeze coolant liquid (i.e., purified ethylene glycol/water mixture) to an ASTM D3306 quality level.

Recapitulating, a first mixture (e.g. 5502A or 5702A) would typically contain a phosphate/silicate/nitrate based inhibitor and a dye of known color (such as blue), which dye would be of such a strength to function to make the entire first mixture the same color of the dye when the phosphate/silicate/nitrate based inhibitor, and the antifoam agent, and the dye are mixed together. Similarly, the second mixture (e.g. 5502B or 5702B) would also typically contain a phosphate/silicate/nitrate based inhibitor and an antifoam agent and a dye of a known color (such as yellow), which dye would also function to make the entire second mixture the same color of the dye when the phosphate/silicate/nitrate based inhibitor, the antifoam agent and the dye are mixed together. With the color of the first mixture known and the color of the second mixture known, when the first and second mixtures are mixed together and added to the purified engine antifreeze coolant liquid (i.e., ethylene glycol and water, which is clear and/or the color of water), the resulting engine antifreeze coolant liquid will have a predictable known color. Thus, the resulting engine antifreeze coolant liquid with a predictable known color would indicate that the first and second mixtures were indeed added to the purified engine antifreeze coolant liquid.

The resins (i.e., ion exchange materials) for the mixed bed ion exchangers 124 and 126, the cation exchange bed ion exchanger 130, and the anion exchange bed ion exchanger 132 are granular and porous synthetic resins typically manufactured from polymeric material such as styrene divinylbenzene, crosslinked styrene/divinylbenzene, and crosslinked acrylic copolymers such as acrylic divinylbenzene matrix, or any other material which is capable of containing active groups (e.g. sulfonic, carboxylic, phenolic, or substituted amino groups) that give the resin the property of combining with or exchanging ions between the resin and a solution such as contaminated engine antifreeze coolant liquid. Preferably, the synthetic resins of this invention are manufactured from a polymer, such as the styrene divinylbenzene copolymer, that serves as a backbone support for acidic or basic functional groups. The acidic functional groups exchange cations (positively charged ions) and may be either strong or weak in acid strength. The basic functional groups exchange anions (negatively charged ions) and may be either strong or weak in base strength.

Typical weak acid cations exchange resins are of the carboxylic acid type (—COOH) cation exchangers. Examples of such carboxylic acid type cation exchangers include carboxylic divinyl benzene copolymers, copolymers of maleic anhydride with styrene and divinyl benzene. Suitable weak acid cation exchange resins include CCR-2 available from Dow Chemical Company, IR 84 available from Rohm & Haas, and IONAC® CC and IONAC® CNN available from Sybron Chemicals Inc. A typical structural diagram for a weakly acidic cation exchanger structure (acrylic divinyl benzene mixture) would be:

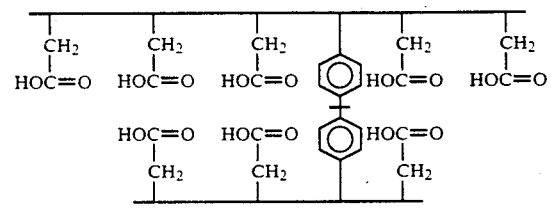

A weak acid cation exchange reaction can be represented as P—COOH+M+→P—COO−M++H+ with P symbolizing the polymer support and M+ generally representing a positively charged ion. Weak acid cation exchange resins exhibit a high affinity for hydrogen ions; that is, the resins hold on more tightly to their hydrogen ion, especially when compared to strong acid cation exchange resins.

Typical strong acid cation exchange resins include hydrogen and sodium zeolites and hydrogen and sodium sulfonate resins. Examples of such strong acid cation exchange materials include HCR-S or HGR-W available from Dow Chemical Company, IK 120+ available from Rohm & Haas Chemical Company, and IONAC® C-249 available from Sybron Chemicals Inc. A typical structural diagram for a strong cation exchanger structure (styrene-divinylbenzene matrix) having a sulfonic acid (—SO₃H) functional group is:

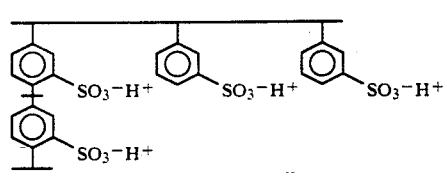

A strong acid cation exchange reaction can be represented as: P—SO₃H+M+→P—SO₃M++H+ with P symbolizing the polymer support and M+ generally representing a positively charged ion. The strong acid cation exchanger is more willing to donate a hydrogen ion (H+) than the weak acid cation exchange resin; and thus, is more effective at removing cations from the engine antifreeze coolant liquid than a weak acid cation exchange resin. As a hydrogen ion is readily released into the effluent/engine antifreeze coolant liquid, a counter ion (a cation) is removed and retained from the effluent/engine antifreeze coolant liquid by the functional group (e.g. sulfonate group) of the strong acid cation exchange resin to maintain electrical neutrality.

Typical weak base anion exchange resins are of the aminated basic type ($-NHR_2^+$) anion exchangers. Examples of such aminated basic type anion exchanges include styrene divinylbenzene matrix and epoxy-amine matrix. Suitable weak basic anion exchange resins include IONAC® AFP-329 available from Sybron Chemicals. A typical structural diagram for a weakly basic anion exchanger structure (styrene-divinyl-benzene matrix) would be:

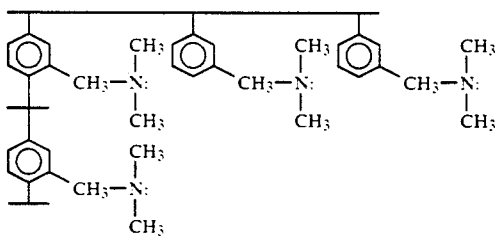

A weak base anion exchange reaction can be represented by:

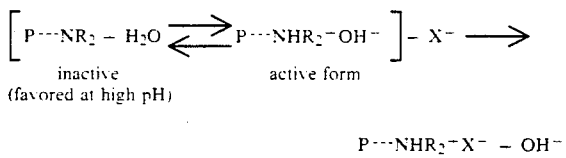

$$P\text{---}NHR_2^+X^- - OH^-$$

with P symbolizing the polymer support, R representing a radical such as $-CH_3$, and $X^-$ generically representing a negatively charged ion. Weak basic anion exchange resins exhibit a high affinity for hydroxide ions; that is, the resins hold on more tightly to their hydroxide ion, especially vis-a-vis to a strong basic anion exchange resins. Typical strong basic anion exchange resins include styrene divinylbenzene. Examples of such anion exchange materials are ASB-1 from Sybron Chemicals, SBR and SAR available from Dow Chemical Company and IKA 400 available from Rohm & Haas Chemical Company. A typical structural diagram for a strong base Type 1 anion exchanger structure (styrene-divinylbenzene matrix) would be:

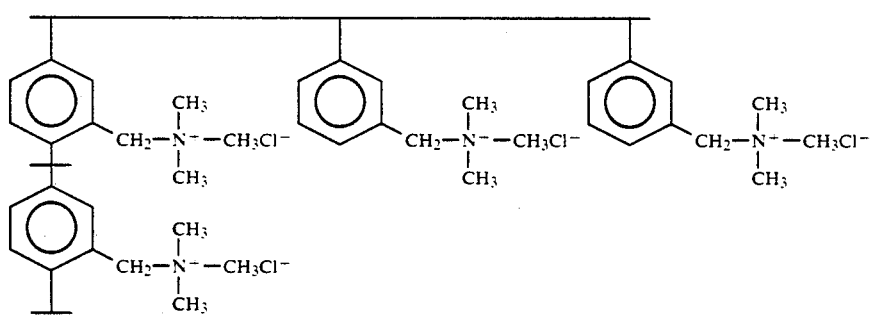

For a Type 2 anion exchanger structure, a hydroxide ion would replace the chloride ion in the Type 2 anion exchanger structure. A strong base anion exchange reaction can be represented as:

$$P\text{---}NR_3^-OH^- + X^- \rightarrow P\text{---}NR_3^-X^- + OH^-$$

with P symbolizing the polymer support, R representing a radical such as $-CH_3$, and $X^-$ generically representing a negatively charged ion.

The strong base anion exchange resin is more willing to donate a hydroxide ion ($OH^-$) than the weak base anion exchange resin. More specifically, a strongly basic group, such as a quaternary ammonium hydroxide ($-NR_3OH$), on an anion exchange resin readily donates its associated hydroxide ion to the engine antifreeze coolant liquid, provided an anion is available in the engine antifreeze coolant liquid to associate with the resulting quaternary ammonium group ($-NR_3^+$) to maintain electrical neutrality. In contrast, a weakly basic functional group, such as $-NHR_2$ or a tertiary amine, on an anion exchange resin exerts a much smaller force of attraction towards anions in the engine antifreeze coolant liquid. Additionally, at a high pH (i.e., above about 8.0) weakly basic functional groups are converted into a non-ionic form which affectively deactivates the ion-exchange properties of the anion exchange resin.

Figure 21:
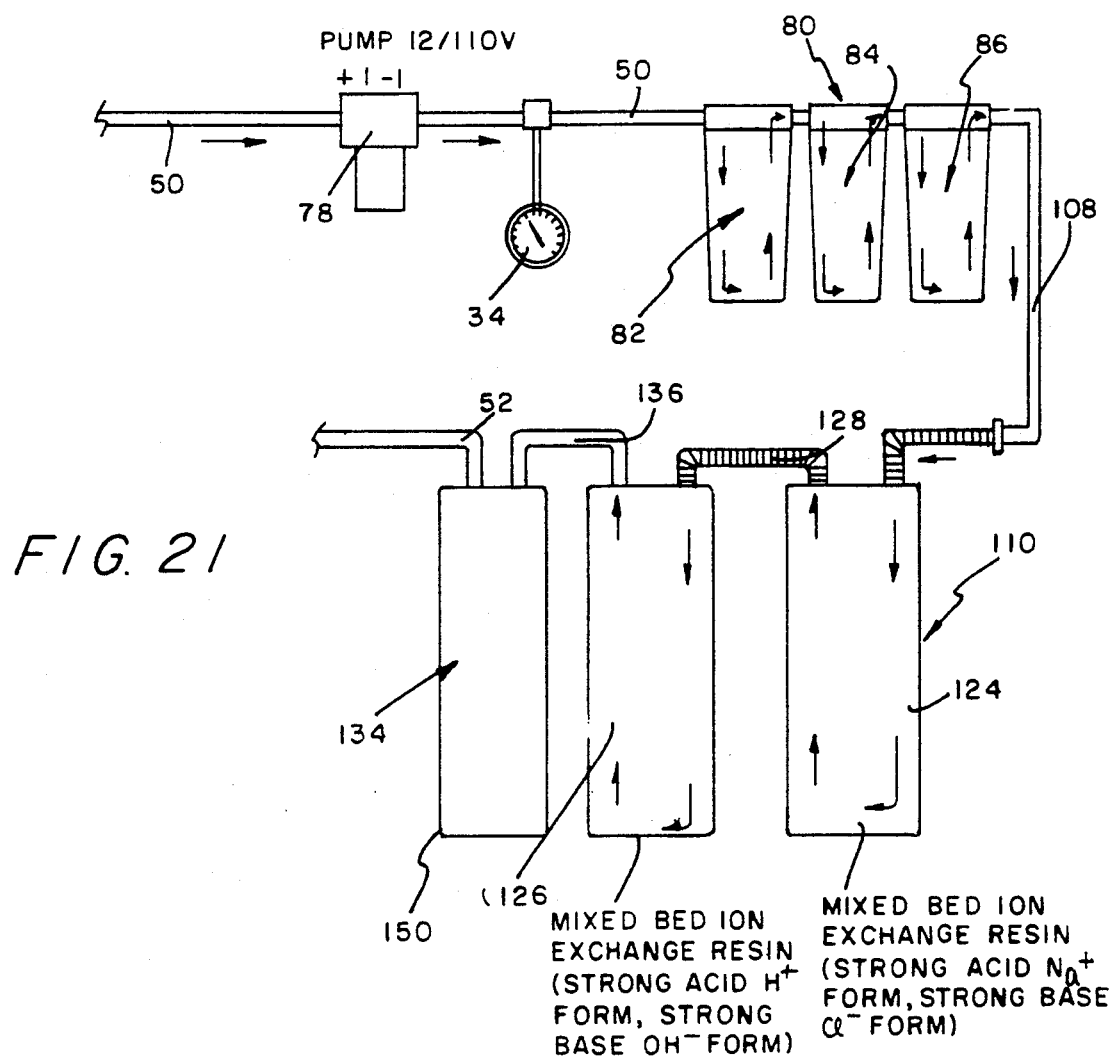
FIG. 21 is a partial schematic view of another embodiment of the present invention.

In a preferred embodiment of the present invention depicted in FIG. 21, the mixed bed ion exchanger 124 comprises a plurality of strong acid cation exchange resins in the Na+ form and a plurality of strong base anion exchange resins in the Cl− form, all comingled together randomly and contained in a container. Similarly, the mixed bed ion exchanger 126 is a plurality of strong acid cation exchange resins in the H+ form and a plurality of strong base anion exchange resins in the OH− form, all comingled together randomly and contained in a container. The preferred strong acid cation exchange resin in the Na+ form is a bead-form resin that is commercially available as IONAC® C-249 from Sybron Chemicals Inc. IONAC® C-249 has a cross-linked styrene/divinylbenzene polymer structure with a $-SO_3-Na^+$ functional structure. The preferred strong acid cation exchange resins in the $H^+$ form is a bead-form resin that is commercially available as IONAC® C-249 from Sybron Chemicals Inc. IONAC C-249 has a styrene divinylbenzene polymer structure with a $-SO_3-H^+$ functional group. The strong base anion exchange resins in the Cl− form is preferably a bead-form resin that is commercially available as IONAC® ASB-2HP Type 1 from the Sybron Chemicals Inc. IONAC® ASB-2HP has a Type 1 styrene-divinylbenzene polymer structure with $-CH_2N(CH_3)_3Cl$ functional groups. The strong base anion exchange resin in the OH- form is preferably a bead-form resin that is commercially available as IONAC® ASB-2HP Type II from Sybron Chemicals Inc. IONAC® ASB-2HP has a Type II styrene-divinylbenzene polymer structure with a —CH$_2$N(CH$_3$)$_3$OH functional group.

In the preferred embodiment of the present invention depicted in FIG. 21, contaminated engine antifreeze coolant liquid flows through conduit 108, preferably at a flow rate of from about 1 gal. per min. to about 10 gal. per min., and into the mixed bed ion exchanger 124 where the strong acid cation exchange resins in the Na+ form removes at least some of the cations (e.g. calcium, magnesium, sodium, potassium, iron, manganese, copper, aluminum, mercury, varium, arsenic, lead, cadmium, silver, chromium, zinc, and hydronium, etc.) from the contaminated engine antifreeze coolant liquid while essentially simultaneously releasing thereinto their associated sodium ion (Na+). Concomitantly, the strong base anion exchange resins in the Cl− form in the same mixed bed ion exchanger 124 removes at least some of the anions (e.g. chloride, sulfate, nitrate, carbonate, bicarbonate, silicate, fluoride, nitrite, sulfite, hydroxide, etc.) from the contaminated engine antifreeze coolant liquid while essentially simultaneously releasing thereinto their associated chloride ion (Cl−). After a residence of from about 5 mins. to about 15 mins. in the mixed bed ion exchanger 124, the engine antifreeze coolant liquid (containing released sodium and chloride ions, and perhaps some residual anions and cations which were not removed) leaves the mixed bed ion exchanger 124 through conduit 128 and passes into the mixed bed ion exchanger 126, preferably at the same flow rate of from about 1 gal. per min. to about 10 gal. per min. In the mixed bed ion exchanger 126, the strong acid cation exchange resins in the H+ form removes at least some of the released sodium ions (i.e., previously released from the strong acid cation exchange resins in the Na+ form situated in mixed bed ion exchanger 124) in the engine antifreeze coolant liquid while essentially simultaneously releasing thereinto their associated hydrogen ion (H+). Concomitantly, the strong base anion exchange resins in the OH− form in the same mixed bed ion exchanger 126 removes at least some of the released chloride ions (i.e., previously released from the strong base anion exchange resins in the Cl− form situated in mixed bed ion exchanger 124) in the engine antifreeze coolant liquid while essentially simultaneously releasing thereinto their associated hydrogen ion (OH−). The released hydrogen ions and the released hydroxide ions can combine to form water (H$_2$O) which becomes part of the water/aqueous phase of the engine antifreeze coolant liquid. After a residence time of from about 5 mins. to about 15 mins. in the mixed bed ion exchanger 126, the engine antifreeze coolant liquid exits mixed bed ion exchanger 126 and passes into conduit 136, which as previously indicated, intercommunicates the separating zone 134 with the mixed bed in ion exchanger 126.

When the engine antifreeze coolant liquid passes into conduit 136, it typically contains residual anions and cations which were not removed by the mixed bed ion exchanger 124, along with traces of released sodium ions and chloride ions that were not removed by the mixed bed ion exchanger 126. It is to be understood that the intent is to have all anions and cations in the engine antifreeze coolant liquid removed by the mixed bed ion exchanger 124 and to have all of the released sodium and chloride ions removed by the mixed bed ion exchanger 126. However, one hundred percent (100%) removal is not guaranteed and traces of anions and cations, along with traces of released sodium and chloride ions, may remain in the engine antifreeze coolant liquid exiting mixed bed ion exchanger 126 and passing into conduit 136 in the form of residual anions, residual cations, residual sodium ions and residual chloride ions. Some of the residual anions may include nitrite ions (NO$_2^-$) which originates from sodium nitrite. Sodium nitrite is a compound included within a corrosion inhibitor additive which previously had been added to the engine antifreeze coolant liquid to prevent corrosion of the metal of the engine cooling system (including the engine itself) from which the contaminated engine antifreeze coolant liquid was removed. Nitrite ions not removed by the strong acid cations exchange resins in the Na+ form dispensed in the mixed bed ion exchanger 124, and passing into contact with the strong acid cation exchange resins in the H+ form and positioned in the mixed bed ion exchanger 126, forms nitrous acid (HNO$_2$) with hydrogen ions released by the strong acid cation exchange resins in the H+ form. Nitrous acid decomposes into nitric oxide gas (NO) which in turn can combine with oxygen (O$_2$) to form nitrogen dioxide gas (NO$_2$). Oxygen is available to combine with nitric oxide from being entrained or otherwise contained in the water/aqueous phase of the engine antifreeze coolant liquid. The reactions and combinations may be represented as follows:

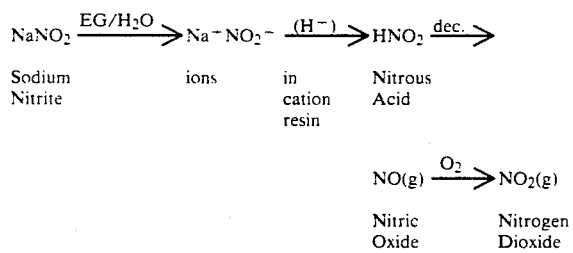

| NaNO$_2$ | $\xrightarrow{EG/H_2O}$ | Na$^+$ NO$_2^-$ | $\xrightarrow{(H^+)}$ | HNO$_2$ | $\xrightarrow{dec.}$ |
|---|---|---|---|---|---|
| Sodium Nitrite | | ions | in cation resin | Nitrous Acid | |

$$NO(g) \xrightarrow{O_2} NO_2(g)$$

Nitric Oxide    Nitrogen Dioxide

The nitrogen containing compounds HNO$_2$, NO, and NO$_2$ are extremely deleterious. The nitrogen containing gases NO and/or NO$_2$ are particularly extremely deleterious, especially to human health. Thus, in a preferred embodiment of the present invention, the nitrogen containing compounds comprising the nitrogen-containing gas (i.e., NO and/or NO$_2$) are removed from the engine antifreeze coolant liquid in the zone for separating 134 which receives the engine antifreeze coolant liquid from the mixed bed ion exchanger 126.

The zone for separating 134 for the preferred embodiment of the invention depicted in FIG. 21 may be any separating means (e.g. a separator, etc.) which is capable of removing the nitrogen containing compounds, particularly the gas(es) containing nitrogen, from the engine antifreeze coolant liquid. Preferably, the separating zone 134 is any suitable nitrogen containing gas adsorber. More preferably, the nitrogen containing gas adsorber comprises a filter container 150 having activated carbon particulate for filtering, trapping, or otherwise removing the nitrogen containing compounds. The activated carbon particulates of this invention for the filter container 150 is an amorphous form of carbon characterized by high adsorptivity for nitrogen-containing gas, such as the NO and/or NO$_2$. The carbon is obtained by the destructive distillation of such carbonaceous materials as animal bones, nut shells, and wood. The carbon is "activated" by heating at a temperature of 800° C. to 900° C. with steam and/or carbon dioxide, resulting in an internal structure defined with porosity (i.e., honeycomb-like). The internal surface area of the activated carbon for the filter container 150 may be of any suitable particulate size, such as having a surface area of from about 70 m²/g to about 2000 m²/g with an apparent density of from about 0.35 to about 0.65, and a mesh size ranging from about 4×6 to about 28×34; more preferably, the activated carbon particulate has a surface area of from about 900 m²/g to about 1100 m²/g with an apparent density of from about 0.44 to about 0.55 and a mesh size ranging from about 12×16 to about 20×24. Most preferably, the activated carbon particulate for filter container 150 has a surface area of about 1000 m²/g, an apparent density of about 0.49 and a mesh size of about 16×20. The most preferred activated carbon particulate for filter container 150 may be purchased commercially from American Norit Co. Inc. under the trademark NORIT® RB-1. It has been discovered that best nitrogen gas adsorption from the engine antifreeze coolant liquid is obtained with employment of the most preferred activated carbon particulate comprising a surface area of about 1000 m²/g, an apparent density of about 0.49 and a mesh size of about 16×20.

In a preferred embodiment of the present invention illustrated in FIGS. 19, 22 and 23, the cation exchange bed ion exchanger 130 comprises a plurality of strong acid cation exchange resins 160 (see FIG. 14) in the H⁺ form. The anion exchange bed ion exchanger 132 comprises a plurality of strong base anion exchange resins in the OH⁻ form. The preferred strong acid cation exchange resins in the H⁺ form is a bead-form resin that is commercially available as IONAC® C-249 from Sybron Chemicals Inc. IONAC® C-249 has a styrene divinylbenzene polymer structure with —SO₃H functional groups. The strong base anion exchange resin in the OH⁻ form is preferably a bead-form resin that is commercially available under the trademark IONAC® ASB 2HP Type II from Sybron Chemicals Inc. IONAC ASB-2HP has a Type II styrene-divinylbenzene polymer structure with a —CH₂N(CH₃)₃OH functional group.

In the preferred embodiment of the present invention depicted in FIGS. 19, 22 and 23, contaminated engine antifreeze coolant liquid flows through conduit 108, preferably at a flow rate of from about 1 gal. per min. to about 10 gals. per min., and into the cation exchange bed ion exchanger 130 where the strong acid cation exchange resins in the H⁺ form removes at least some of the cations (e.g. calcium, magnesium, sodium, potassium, iron, manganese, copper, aluminum, mercury, barium, arsenic, lead, cadmium, silver, chromium, zinc, and hydronium, etc.) from the contaminated engine antifreeze coolant liquid while essentially simultaneously releasing thereinto their associated hydrogen ion (H⁺). After a residence time of from about 5 mins. to about 15 mins. in the cation exchange bed ion exchanger 130, the engine antifreeze coolant liquid (containing released hydrogen ions, anions, and perhaps some residual cations which were not removed) leaves the cation exchange bed ion exchanger 130 through conduit 128 and passes into the anion exchange bed ion exchanger 132, preferably at the same flow rate of from about 1 gal. per min. to about 10 gal. per min. In the anion exchange bed ion exchanger 130, the strong base anion exchange resins in the OH⁻ form removes at least some of the anions (e.g. chloride, sulfate, nitrate, carbonate, bicarbonate, silicate, fluoride, nitrite, sulfite, hydroxide, etc.) from the contaminated engine antifreeze coolant liquid while essentially simultaneously releasing thereinto their associated hydroxide ion (OH⁻). The hydrogen ions released in the cation exchange bed ion exchanger 130 and the hydroxide ions released in the anion exchange bed ion exchanger 132 combine to form water (H₂O) which becomes part of the water/aqueous phase of the engine antifreeze coolant liquid. After a residence time of from about 5 mins. to about 15 mins. in the anion exchange bed ion exchanger 132, the engine antifreeze coolant liquid exits the anion exchange bed ion exchanger 132 and, for the embodiment of the invention depicted in FIGS. 22 and 23, passes into the separating zone/separator 134 via conduit 136.

In a further preferred embodiment of the present invention illustrated in FIGS. 19, 22 and 23, it is more preferred that in order to completely de-ionize the engine antifreeze coolant liquid without additional ion exchange steps, it is essential that the hydrogen form of the cation resin 160 be used instead of the sodium form. Likewise, the hydroxide form of the anion resin is preferably used and not the chloride form. The hydrogen form of the cation exchange resin 160 releases hydrogen ions as it removes cations from the effluent engine antifreeze coolant liquid. The hydroxide form of the anion exchange resin releases hydroxide ions as it removes anions from the effluent engine antifreeze coolant liquid. Hydrogen ions combine with hydroxide ions to form water. The following diagram represents the reactions and combinations for H⁺ and OH⁻ forms on cation/anion resins:

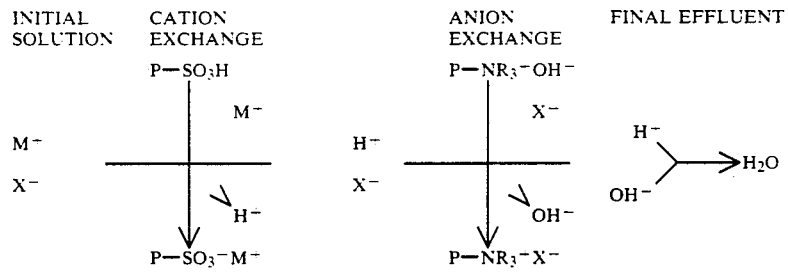

with M⁺ representing a positively charged ion, X⁻ representing a negatively charged ion, and P symbolizing the polymer support.

If the sodium and chloride forms of cation/anion resins were used in the final step of purification, a solution containing sodium chloride would be obtained. Chloride ions, in particular, promote corrosion of metals and must not be present in the final effluent if a Na⁺/Cl⁻ free final effluent is desired. The following diagram represents the reactions and combinations for the use of Na⁺ and Cl⁻ forms on cation/anion resins:

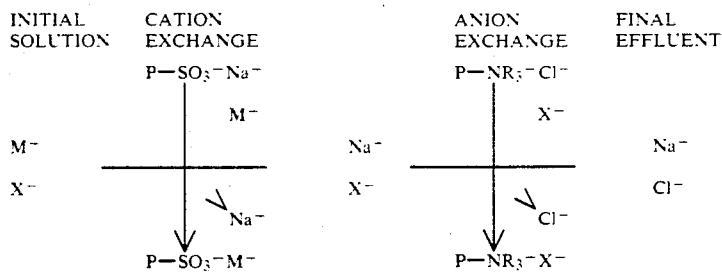

with $M^-$ representing a positively charged ion, $X^-$ representing a negatively charged ion, and P symbolizing the polymer support. Whenever the sodium/chloride forms of ion exchange cation/anion resins are employed in the present invention, the effluent engine antifreeze coolant liquid must subsequently go through a third ion exchange process with the hydrogen and hydroxide forms of cation/anion resins in order to remove $Na^-$ and $Cl^-$.

It is further preferred that when the $H^-$ form and $OH^-$ form of the cation resins and anion resins, respectively, are employed, the cation exchange bed ion exchanger 130 is to precede or be disposed in front of the anion exchange bed ion exchanger 132. If the engine antifreeze coolant liquid contacts the anion exchange resin with the $OH^-$ form before contacting the cation exchange resin with the $H^-$ form, the hydroxide ions released in anion exchange process would form insoluble hydroxide precipitates (e.g., $Mg(OH)_2$, $Cu(OH)_2$, $Fe(OH)_3$, $Al(OH)_3$, etc.), with many metal cations present in the engine antifreeze coolant liquid leaving the anion exchange bed ion exchanger 132. After the engine antifreeze coolant liquid enters the cation exchange bed ion exchanger 130, these gelatinous precipitates would foul the cation resin 160 therein long before its capacity for removal of cations was reached. By running the coolant solution through the cation exchange bed ion exchanger 130 first, all metal cations are exchanged for hydrogen ions. Then in the anion exchange bed ion exchanger 132, these hydrogen ions react with the released hydroxide ions to produce water.

Many contaminated engine antifreeze coolant liquids contain nitrite salts, such as sodium nitrite, which is a compound that forms the basis for a corrosion inhibitor additive, as previously indicated. When the contaminated engine antifreeze coolant liquid enters into and is in the cation exchange bed ion exchanger 130 in FIGS. 19, 22 and 23, hydrogen ions released off of the strong acid cation exchange resins 160 in the $H^+$ form, combines with the nitrite ion to convert it into nitrous acid ($HNO_2$). At least some of the nitrous acid decomposes into nitric oxide gas (NO) before it is exchanged as nitrite in the anion exchange bed in exchanger 132. As previously indicated, nitric oxide gas can combine with oxygen ($O_2$), which is available through entrainment in the water/aqueous phase of the engine antifreeze coolant liquid, to form nitrogen dioxide gas ($NO_2$) The reactions and combinations may again be represented as follows:

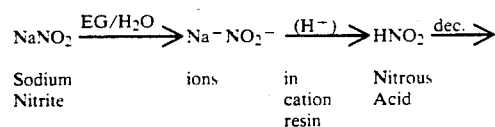

Sodium    ions    in         Nitrous
Nitrite           cation     Acid
                  resin -continued

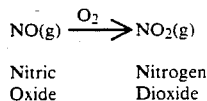

Nitric         Nitrogen
Oxide          Dioxide

The nitrogen containing compounds, especially the NO and/or $NO_2$, are removed to protect human health. This is the function of the separating zone/separator 134 illustrated in FIGS. 22 and 23, to remove the nitrogen containing compounds NO and/or $NO_2$ through trapping, or otherwise separating out, the NO and/or $NO_2$ from the engine antifreeze coolant liquid exiting the anion exchange bed ion exchanger 132. It is expected that the bulk of the nitrous acid and/or NO and/or $NO_2$ is formed in the cation exchange bed ion exchanger 130 before passing through conduit 128 and into the anion exchange bed ion exchanger 132. However, it is anticipated that nitrous acid and/or NO and/or $NO_2$ also forms in the conduit 128, the anion exchange bed ion exchanger 132, and in the conduit 136 leading from the anion exchange bed ion exchanger 132 to the separator/separating zone 134. The spirit and scope of the present invention encompasses the removal of the nitrogen containing compounds (NO and/or $NO_2$) by the separator/separating zone 134 that were formed at any locale before the separator/separating zone 134, including the cation exchange bed ion exchanger 130, the conduit 128, the anion exchange bed ion exchanger 132, and the conduit 136.

The zone for separating/separator 134 for the preferred embodiment of the invention depicted in FIGS. 22 and 23 may be any suitable separating means (e.g. a separator, etc.) which is capable of removing the nitrogen containing compounds, particularly the gas(es) containing nitrogen, from the engine antifreeze coolant liquid. Preferably, the separating zone 134 in FIGS. 22 and 23 is any suitable nitrogen-containing gas adsorber. More preferably, the nitrogen containing gas adsorber comprises the filter container 150 of FIG. 21 having activated carbon particulate for filtering, trapping, or otherwise removing the nitrogen containing compounds. The activated carbon particulate of this invention for the filter container 150 in FIGS. 22 and 23 is essentially an amorphous form of carbon characterized by high adsorptivity for nitrogen-containing gas, such as the NO and/or $NO_2$. The carbon is obtained by the destructive distillation of such carbonaceous materials as animal bones, nut shells, and wood. The carbon is "activated" as the carbon in container 150 of FIG. 21 by heating at a temperature of 800° C. to 900° C. with steam and/or carbon dioxide, resulting in an internal structure defined with porosity (i.e., honeycomb-like). The internal surface area of the activated carbon for the filter container 150 in FIGS. 22 and 23 may be of any suitable particulate size, such as having a surface area of from about 70 m²/g to about 2000 m²/g with an apparent density of from about 0.35 to about 0.65, and a mesh size (U.S. Sieve Series) ranging from about 4×6 to about 28×34; more preferably, the activated carbon particulate for the embodiment of the invention in FIGS. 22 and 23 is a particulate activated carbon bought commercially under the trademark NORIT ® owned by the American Norit Co. Inc., such as NO-RIT ® RB 1, NORIT ® RB 2, NORIT ® RB 3, and NORIT ® RB 4 which respectively have the properties listed in the following TABLE I:

| TYPICAL ANALYSIS | RB 1 | RB 2 | RB 3 | RB 4 |
|---|---|---|---|---|
| Apparent density, g/ml | .490 | .490 | .460 | .460 |
| Moisture, % as packed | 2.0 | 2.0 | 2.0 | 2.0 |
| Ash, % | 6.0 | 6.0 | 6.0 | 6.0 |
| Hardness (ASTM) | 99 | 99 | 99 | 99 |
| Ignition temp. (ASTM), °C. | 450 | 450 | 450 | 450 |
| Pore size distribution, ml/g: | | | | |
| micropores (less than 1 nm) | 0.36 | 0.36 | 0.36 | 0.36 |
| transitional pores (1-100 nm) | 0.08 | 0.08 | 0.08 | 0.08 |
| macropores (greater than 100 nm) | 0.41 | 0.41 | 0.41 | 0.41 |
| Surface area ($N_2$-BET), m²/g | 1000 | 1000 | 1000 | 1000 |
| Pellet diameter, nm | 1.0 | 2.0 | 2.9 | 3.8 |
| Corresponding mesh size, U.S. Sieve Series | 16 × 20 | 8 × 12 | 6 × 8 | 4 × 6 |

In a preferred embodiment of the invention, the most preferred activated carbon particulate for filter container 150 in FIGS. 22 and 23 is that purchased commercially from American Norit Co. Inc. under the trademark NORIT ® RB-1. It has been discovered that for the preferred embodiment of the invention in FIGS. 22 and 23, the best adsorption of nitrogen gas from the engine antifreeze coolant liquid is obtained with employment of the most preferred activated carbon particulate comprising a surface area of about 1000 m²/g, an apparent density of about 0.49 and a mesh size of about 16×20.

As was seen for the preferred embodiment of the invention depicted in FIG. 21, it is intended that all of the anions and cations in the engine coolant liquid for the preferred embodiment of the invention in FIGS. 19, 22 and 23 are removed by cation exchange bed ion exchanger 130 and anion exchange bed ion exchanger 132 by a single passage through the apparatus 10; and that all of the nitrogen containing compounds (i.e., NO and/or $NO_2$) are removed by adsorber/separator 134 for the preferred embodiment of the invention in FIGS. 22 and 23 also by a single passage through the apparatus 10. However, one hundred percent (100%) removal of these constituents are not guaranteed, and traces of anions, cations and nitrogen containing compounds may remain in the purified engine antifreeze coolant liquid after a single pass through the apparatus 10. Therefore, optionally, the purified engine antifreeze coolant liquid may be recycled through the apparatus 10 again to ensure a more complete purification. Thus, the spirit and scope of the present invention for the preferred embodiment of the invention illustrated in FIGS. 19, 22 and 23 includes recycling the purified engine antifreeze coolant liquid as many times as necessary to ensure complete purification.

With continuing reference to the drawings for operation of the present invention, any suction hose (such as conduit 58) is connected or engaged to inlet conduit 50 at connection 53 and is placed in communication with contaminated engine antifreeze coolant liquid such as by inserting into a drum (not shown) containing the contaminated engine antifreeze coolant liquid or by connecting to an engine cooling system at connection 54. The contaminated engine antifreeze coolant liquid has particulates, hydrocarbons, anions and cations, all of which are to be removed by the apparatus 10. Clamps 36—36 are engaged to a DC power source, such as battery 40. Switch 32 is turned to an "on" position which energizes pump 78 to start the intake or flow (at 1 to 10 gal. per in.) of contaminated engine antifreeze coolant liquid into inlet conduit 50 and through valve 76, through pump 78, and into communication with pressure gauge 34 which displays a certain pressure. A displayed high pressure (e.g. greater than 70 psi) indicates that there is a blockage downstream, such as in the filtering zone 80 or in the ion exchange zone 110. A normal pressure (e.g. 35 psi) indicates that there is no blockage downstream (i.e., between pressure gauge 34 and connection 74). For the embodiment of the invention illustrated in FIGS. 19 and 21, from communication with pressure gauge 34 in inlet conduit 50, contaminated engine antifreeze coolant liquid enters into the filtering zone 80, more specifically it passes through inlet filter conduit 96 and into mechanical filter 82 where any larger particulates, such as 25 microns or larger, are removed. From the mechanical filter 82, the contaminated engine antifreeze coolant liquid passes through outlet filter conduit 98 and into the chemical filter 84 where hydrocarbons (and any other chemicals and contaminating liquids, except water and ethylene glycol) are removed. Typical hydrocarbons that are removed in chemical filter 84 are grease, oil, etc. From chemical filter 84, the contaminated engine antifreeze coolant liquid passes through inlet filter conduit 96 and into mechanical filter 86 where the smaller particulates (such as 5 microns or larger) are removed. From the mechanical filter 86, filtered/contaminated engine antifreeze coolant liquid passes through outlet filter conduit 98 and into intermediate conduit 108.

In the preferred embodiment of the invention depicted in FIG. 23, the filtering zone 80 is split such that mechanical filter 82 precedes the pump 78 and pressure gauge 34, and chemical filter 84 and mechanical filter 86 follows the pump 78 and pressure gauge 34. In this preferred embodiment of the invention, the larger particulates (e.g. 25 microns or larger) are removed from the contaminated engine antifreeze coolant liquid in mechanical filter 82 before the contaminated engine antifreeze coolant liquid passes through pump 78 to prevent gross particulates from entering the pump 78 and damaging it. After the larger particulates have been removed from the contaminated engine antifreeze coolant liquid, the contaminated engine antifreeze coolant liquid passes through the pump 78 and into communication with the pressure gauge 34 and subsequently into the chemical filter 84 for removal of the hydrocarbons (i.e., oil, grease, etc.). From the chemical filter 84, the contaminated engine antifreeze coolant liquid passes through inlet filter conduit 96 and into the mechanical filter 86 where, as previously indicated, smaller particulates are removed. After essentially all of the desired size particulates (e.g. 5 microns or larger) and essentially all of the hydrocarbons have been removed by the filtering zone 80, the engine antifreeze coolant liquid passes through outlet filter conduit 98 and into the intermediate conduit 108 for transport therein to the ion exchange zone 108 for removal of the cations and the anions.

In the preferred embodiment of the ion exchange zone 108 depicted in FIGS. 19, 22 and 23, contaminated engine antifreeze coolant liquid flows, preferably at a flow rate of from about 1 gal. per min. to about 10 gal. per min., into the strong acid cation exchanger 130 containing strong acid cation exchange resins 160 in the H+ form which remove essentially all of the cations (e.g. calcium, sodium, potassium, etc.) from the contaminated engine antifreeze coolant liquid, while, generally at the same time, releases associated hydrogen ion (H+) into the contaminated engine antifreeze coolant liquid. After a preferred residence time of from about 5 mins. to about 15 mins. in the cation exchange bed ion exchanger 130, the contaminated engine antifreeze coolant liquid leaves the cation exchange bed ion exchanger 130 through conduit 128 for discharge into the anion exchange bed ion exchanger 132 containing strong base anion exchange resins OH− form. When the contaminated engine antifreeze coolant liquid leaves the cation exchange bed ion exchanger 132, it contains released hydrogen ions, anions, and nitrogen containing compounds such as $HNO_2$ and/or $NO$ and/or $NO_2$ These nitrogen containing compounds formulated as a result of released hydrogen ions combining with $NO_2^-$ to produce nitrous acid ($HNO_2$) which in turn decomposes into nitric oxide (NO). As previously indicated, nitric oxide can combine and/or react with oxygen entrained in the engine antifreeze coolant liquid to produce nitrogen dioxide ($NO_2$).

In the anion exchange bed ion exchanger 132, the strong base anion exchange resins in the OH− form removes essentially all of the anions (e.g. chloride, nitrate, nitrite, etc.) from the contaminated engine antifreeze coolant liquid, while, generally at the same time, releases associated hydroxide ion (OH−) into the contaminated engine antifreeze coolant liquid. The released hydroxide ions combine with the hydrogen ions previously released by the strong acid cation exchange resins 160 to form water. The residence time for the contaminated engine antifreeze coolant liquid in the anion exchange bed ion exchanger 132 is preferably from about 5 mins. to about 15 mins. The contaminated engine antifreeze coolant liquid leaves the anion exchange bed ion exchanger 132 through conduit 136 and contains the nitrogen containing compounds. For the preferred embodiment of the invention depicted in FIGS. 22 and 23, the contaminated engine antifreeze coolant liquid passes from the anion exchange bed ion exchanger 132 via conduit 136 into the separating zone/separator 1334 where the hydrogen containing compounds (more particularly NO and/or $NO_2$) are removed. After a residence time of from about 5 mins. to about 15 mins. in the separating zone/separator 134, the engine antifreeze coolant liquid leaves the separation zone/separator 134 as a purified engine antifreeze coolant liquid, and passes into outlet conduit 52 and flows therein through the sensing zone 112 wherein the resistivity and/or conductivity of the purified engine antifreeze coolant liquid is being monitored and/or measured, as an indicator of the ion-removal effectiveness by the ion exchange zone 110 and as a measure of the degree of the purification of the engine antifreeze coolant liquid. After the degree of purification of the purified engine antifreeze coolant liquid has been monitored and/or determined and the indicator light 42 did not light, the purified engine antifreeze coolant liquid flows through electronic valve 114 and continues to flow through outlet conduit 52 for discharge at connection 74. If the indicator light 42 lights, the operator should investigate the ion exchange zone 110 and replace and/or replenish the same, such as removal and replacement of the exhausted cation exchange bed ion exchanger 130 and/or the exhausted anion exchange bed ion exchanger 132. It is intended that the purified engine antifreeze coolant liquid has been sufficiently purified after one (1) single pass through the internals of the apparatus 10. After the engine antifreeze coolant liquid has obtained sufficient purification, it should be essentially clear, having essentially only ethylene glycol and water.

Inhibitors and additives have to be added to the purified engine antifreeze coolant liquid to protect any cooling system of any engine which is to come in contact with the purified engine antifreeze coolant liquid. To the purified engine antifreeze coolant liquid, a yellow inhibitor mixture and a blue inhibitor mixture are added. When both mixtures are added, preferably in equal parts, the purified and treated engine antifreeze coolant liquid will be blue green, indicating that both mixtures of additives and inhibitors were indeed added and that the purified engine antifreeze coolant liquid has been sufficiently treated with additives and inhibitors.

Thus, by the practice of this invention there is provided an apparatus and method for removing particulates, hydrocarbons, cations, anions, and nitrogen containing compounds (produced in the cation exchange bed in exchanger 130), from a contaminated engine antifreeze coolant liquid. The apparatus and method of the present invention has the capability of taking even the dirtiest, most contaminated, used engine antifreeze coolant liquid, purifying it and replacing the used inhibitors and returning it to service. The resulting purified and treated entine antifreeze coolant liquid is formulated to meet the general/performance requirements of ASTM D3306, standard specification for ethylene glycol base engine coolant, a concentrated antifreeze.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A method for removing ions from a liquid comprising the steps of:
   (a) passing a liquid having ions, including nitrite ions, through a cation exchanger bed wherein at least part of the ions are removed and at least part of the nitrite ions is converted into nitrogen containing compounds selected from the group consisting of nitrous acid, nitric oxide, nitrogen dioxide, and mixtures thereof, to produce a liquid with at least part of the ions removed and having nitrogen containing compounds; and
   (b) removing at least part of the nitrogen containing compounds selected from the group consisting of nitrous acid, nitric oxide, nitrogen dioxide, and mixtures thereof, by passing the produced liquid of step (a) through a means for removing nitrogen containing compounds to produce a liquid with at least part of the ions removed and with at least part of the nitrogen containing compounds removed.

2. The method of claim 1 wherein said liquid is an engine coolant liquid.

3. The method of claim 2 wherein said means for removing nitrogen containing compounds comprises activated carbon particulate having a surface area of about 1000 $m^2/g$ with an apparent density of about 0.49 and a mesh size of about 16×20.

4. The method of claim 1 additionally comprising passing, prior to said passing step (a), the liquid through a means for filtering.

5. The method of claim 1 additionally comprising passing, prior to said passing step (b), the produced liquid of step (a) through an anion exchanger bed.

6. The method of claim 1 additionally comprising passing, prior to said passing step (a), the liquid through a first means for filtering; passing subsequently, prior to said passing step (a), the liquid from the first means for filtering through a means for pumping wherein the liquid from the first means for filtering is pumped towards a second means for filtering; and passing subsequently thereafter, prior to said passing step (a), the liquid from the means for pumping through a second means for filtering.

7. The method of claim 1 additionally comprising passing the produced liquid of step (b) through a sensoring means to monitor the resistivity or conductivity of the liquid as a measure of a degree of purification of the liquid.

8. The method of claim 1 additionally comprising adding to the liquid a first mixture having a first color; adding to the liquid a second mixture having a second color which is different from the first color to produce a third color in the liquid which is different from the first color and the second color.

9. The method of claim 1 where said means for removing nitrogen containing compounds comprises activated carbon particulate having a surface area of from about 900 $m^2/g$ to about 1100 $m^2/g$ with an apparent density of from about 0.44 to about 0.55.

10. The method of claim 9 wherein said activated carbon particulate additionally includes a mesh size ranging from about 12×16 to about 20×24.

11. A method for removing cations and anions from a liquid comprising the steps of:
 (a) providing a liquid having cations, anions, and nitrite ions;
 (b) passing the liquid of step (a) through a cation-exchanger bed wherein at least part of the cations are removed and at least part of the nitrite ions is converted into nitrogen containing compounds selected from the group consisting of nitrous acid, nitric oxide, nitrogen dioxide, and mixtures thereof, to produce a liquid containing anions and nitrogen containing compounds selected from the group consisting of nitrous acid, nitric oxide, nitrogen dioxide, and mixtures thereof;
 (c) passing the produced liquid of step (b) through an anion-exchanger bed wherein at least part of the anions are removed to produce a liquid containing nitrogen containing compounds selected from the group consisting of nitrous acid, nitric oxide, nitrogen dioxide, and mixtures thereof; and
 (d) removing at least part of the nitrogen containing compounds selected from the group consisting of nitrous acid, nitric oxide, nitrogen dioxide, and mixtures thereof, by passing the produced liquid of step (c) through a means for separating wherein at least part of the nitrogen containing compounds is removed from the liquid.

12. The method of claim 11 wherein said liquid of step (a) is an engine coolant liquid.

13. The method of claim 12 wherein said engine coolant liquid of step (a) contains a freezing point depressant; and said produced liquid of step (c) contains said freezing point depressant.

14. The method of claim 13 wherein said means for separating of step (d) produces an engine coolant liquid having at least part of the nitrogen containing compound removed and the freezing point depressant.

15. The method of claim 13 wherein said means for separating comprises activated carbon particulate having a surface area of about 1000 $m^2/g$ with an apparent density of about 0.49 and a mesh size of about 16×20.

16. The method of claim 11 additionally comprising passing, prior to said passing step (b), the liquid of step (a) through a means for filtering.

17. The method of claim 16 wherein said means for filtering comprises a chemical filter and a mechanical filter communicating with the chemical filter.

18. The method of claim 11 additionally comprising passing, prior to said passing step (b), the liquid of step (a) through a first means for filtering; passing subsequently, prior to said passing step (b), the liquid from the first means for filtering through a means for pumping wherein the liquid of step (a) from the first means for filtering is pumped towards a second means for filtering; and passing subsequently thereafter, prior to said passing step (b), the liquid from the means for pumping through a second means for filtering.

19. The method of claim 18 wherein said second means for filtering comprises a chemical filter and a mechanical filter communicating with the chemical filter.

20. The method of claim 11 wherein said providing step (a) comprises removing said liquid of step (a) from a cooling system of an internal combustion engine to the exterior of said internal combustion engine; and returning, after said passing step (d), the liquid to the cooling system of the internal combustion engine, wherein said returning liquid has at least part of the cations and anions removed and at least part of the nitrogen containing compounds removed.

21. The method of claim 20 wherein said liquid is an engine coolant liquid containing a freezing point depressant; and said liquid returning to the cooling system of the internal combustion engine contains said freezing point depressant.

22. The method of claim 8 wherein said means for separating comprises activated carbon particulate having a surface area of from about 900 $m^2/g$ to about 1100 $m^2/g$ with an apparent density of from about 0.44 to about 0.55.

23. The method of claim 22 wherein said activated carbon particulate additionally includes a mesh size ranging from about 12×16 to about 20×24.

24. A method for removing particulates, cations, anions and nitrogen containing compounds from an engine coolant liquid comprising the steps of:
 (a) providing an engine coolant having particulates, cations, anions and nitrite ions;

(b) passing the engine coolant liquid of step (a) through a means for filtering wherein at least part of the particulates are removed from the engine coolant liquid to produce an engine coolant liquid comprising cations, anions and nitrite ions;

(c) passing the produced engine coolant liquid of step (b) through a cation exchanger bed wherein at least part of the cations is removed and at least part of the nitrite ions is converted into nitrogen containing compounds selected from the group consisting of nitrous acid, nitric oxide, nitrogen dioxide, and mixtures thereof, to produce an engine coolant liquid containing anions and nitrogen containing compounds;

(d) passing the produced engine coolant liquid of step (c) through an anion-exchanger bed wherein at least part of the anions is removed to produce an engine coolant liquid containing nitrogen containing compounds selected from the group consisting of nitrous acid, nitric oxide, nitrogen dioxide, and mixtures thereof; and (e) removing at least part of the nitrogen containing compounds selected from the group consisting of nitrous acid, nitric oxide, nitrogen dioxide, and mixtures thereof, by passing the produced engine coolant liquid of step (d) through a means for separating wherein at least part of the nitrogen containing compounds is removed from the engine coolant liquid.

25. The method of claim 25 wherein said engine coolant liquid of step (a) contains a freezing point depressant; and said engine coolant liquid returning to the cooling system of the internal combustion engine contains said freezing point depressant.

26. The method of claim 24 wherein said providing step (a) comprises removing said engine coolant liquid of step (a) from a cooling system of an internal combustion engine to the exterior of said internal combustion engine; and returning, after said passing step (e), the engine coolant liquid to the cooling system of the internal combustion engine, wherein said returning engine coolant liquid has at least part of the particulates, the cations, and the anions removed and at least part of the nitrogen containing compounds removed.

27. The method of claim 24 where said means for separating comprises activated carbon particulate having a surface area of from about 900 m$^2$/g to about 1100 m$^2$/g with an apparent density of from about 0.44 to about 0.55.

28. The method of claim 27 wherein said activated carbon particulate additionally includes a mesh size ranging from about 12×16 to about 20×24.

29. A method for removing particulates, cations, anions, and nitrogen containing compounds from an engine coolant liquid comprising the steps of:

(a) providing an engine coolant having particulates, cations, anions and nitrite ions;

(b) passing the engine coolant liquid of step (a) through a means for filtering wherein at least part of the particulates are removed from the engine coolant liquid to produce an engine coolant liquid comprising cations, anions and nitrite ions;

(c) passing the produced engine coolant liquid of step (b) through a strong acid cation exchanger bed in the hydrogen form wherein at least part of the cations is removed and at least part of the nitrite ions is converted into nitrous acid;

(d) passing the produced engine coolant liquid from the strong acid cation exchanger bed through a strong base anion-exchanger bed in the hydroxide form wherein at least part of the anions is removed, said nitrous acid produced in the strong cation exchanger bed decomposes into nitric oxide which combines with oxygen to form nitrogen dioxide such that said strong base anion exchanger bed produces an engine coolant liquid containing nitrogen dioxide; and (e) removing at least part of the nitrogen dioxide from the produced engine coolant liquid by passing the produced engine coolant liquid of step (d) through a means for separating wherein at least part of the nitrogen dioxide is removed from the engine coolant liquid.

30. The method of claim 29 wherein engine coolant liquid of step (a) contains a freezing point depressant; and said produced engine coolant liquid of step (d) contains said freezing point depressant.

31. The method of claim 30 wherein said means for separating of step (e) produces an engine coolant liquid having at least part of the nitrogen gas removed and the freezing point depressant.

32. The method of claim 29 wherein said means for filtering comprises at least one mechanical filter and a chemical filter.

33. The method of claim 32 additionally comprising a means for pumping engine coolant liquid, and a first mechanical filter for receiving the engine coolant liquid of step (a) and in communication with said means for pumping, and said chemical filter is in communication with said means for pumping for receiving engine coolant liquid from the means for pumping and a second mechanical filter is in communication with said chemical filter, said method further additionally comprises passing prior to said passing step (c) the engine coolant liquid of step (a) through the first mechanical filter to remove particulates; passing subsequently prior to said passing step (c) the engine coolant liquid from the first mechanical filter to the means for pumping where the engine coolant liquid is pumped towards the chemical filter; passing prior to said passing step (c) the pumped engine coolant liquid through the chemical filter; and passing subsequently prior to said passing step (c) the engine coolant liquid from the chemical filter through the second mechanical filter for removal of particulates.

34. The method of claim 29 wherein said means for separating comprises activated particulate carbon.

35. The method of claim 29 wherein said providing step (a) comprises removing said engine coolant liquid of step (a) from a cooling system of an internal combustion engine to the exterior of said internal combustion engine; and returning, after said passing step (e), the engine coolant liquid to the cooling system of the internal combustion engine, wherein said returning engine coolant liquid has at least part of the particulates, the cations, and the anions removed and at least part of the nitrogen dioxide removed.

36. The method of claim 35 wherein said engine coolant liquid of step (a) contains a freezing point depressant; and said engine coolant liquid returning to the cooling system of the internal combustion engine contains said freezing point depressant.

37. The method of claim 29 additionally comprising passing, prior to said passing step (b), the engine coolant liquid through a heat exchanger means for cooling the engine coolant liquid.

38. The method of claim 29 where said means for separating comprises activated carbon particulate having a surface area of from about 900 m$^2$/g to about 1100 m$^2$/g with an apparent density of from about 0.44 to about 0.55.

39. The method of claim 38 wherein said activated carbon particulate additionally includes a mesh size ranging from about 12×16 to about 20×24.

40. The method of claim 29 wherein said means for separating comprises activated carbon particulate having a surface area of about 1000 m$^2$/g with an apparent density of about 0.49 and a mesh size of about 16×20.

41. A method for removing cations and anions from an engine coolant liquid having a freezing point depressant and situated in a cooling system of an internal combustion engine, comprising the steps of:
(a) removing an engine coolant liquid having cations, anions, particulates, hydrocarbons, and a freezing point depressant and situated in an internal combustion engine, from a cooling system of said internal combustion engine to the exterior of said internal combustion engine;
(b) passing the engine coolant liquid through a first mechanical filter for filtering and removing part of the particulates, leaving residual particulates in the engine coolant liquid;
(c) passing the engine coolant liquid having the residual particulates through a means for pumping wherein the engine coolant liquid is pumped;
(d) passing the pumped engine coolant liquid through a chemical filter wherein at least part of the hydrocarbons is removed;
(e) passing the engine coolant liquid having at least part of the hydrocarbons removed through a second mechanical filter for filtering and removing at least part of the residual particulates to produce engine coolant liquid having cations, anions, and the freezing point depressant;
(f) passing the engine coolant liquid, having the cations and the anions and the freezing point depressant, through a cation-exchanger bed wherein at least part of the cations are removed from the engine coolant liquid;
(g) passing the engine coolant liquid, having at least part of the cations removed and having the anions and the freezing point depressant, through an anion-exchanger bed wherein at least part of the anions are removed from the engine coolant liquid; and
(h) returning the engine coolant liquid to the cooling system of the internal combustion engine, wherein said returning engine coolant liquid has at least part of the cations and anions removed and has the freezing point depressant.

42. The method of claim 41 wherein said engine coolant liquid from the anion-exchanger bed additionally comprises a nitrogen containing compound selected from the group consisting of nitrous acid, nitric oxide, nitrogen dioxide, and mixtures thereof.

43. The method of claim 42 additionally comprising removing, prior to said returning step (h), the nitrogen containing compound from the engine coolant liquid.

44. The method of claim 41 additionally comprising passing prior to step (b) the engine coolant liquid of step (a) through a heat exchanger.

45. The method of claim 44 additionally comprising detecting, prior to step (d) and after step (c), the pressure of the pumped engine coolant liquid.

46. The method of claim 45 additionally comprising passing, prior to step (h), the engine coolant liquid through a means for sensoring for monitoring the resistivity or conductivity of the engine coolant liquid as a measure of a degree of purification of the engine coolant liquid.

47. A method for removing particulates, hydrocarbons, cations, anions and nitrite ions from an engine coolant liquid having a freezing point depressant comprising the steps of:
(a) providing an engine coolant having particulates, hydrocarbons, cations, anions and nitrite ions, and a freezing point depressant;
(b) passing the engine coolant liquid of step (a) through a first mechanical filtering means for filtering and wherein part of the particulates are removed to produce an engine coolant liquid having residual particulates, hydrocarbons, cations, anions, nitrite ions, and the freezing point depressant;
(c) passing the produced engine coolant liquid of step (b) through a means for pumping wherein the produced engine coolant liquid of step (b) is pumped towards a chemical filtering means for filtering and wherein at least part of the hydrocarbons is to be removed;
(d) passing the pumped engine coolant liquid of step (c) through a chemical filtering means for filtering and wherein at least part of the hydrocarbons is removed to produced an engine coolant liquid having residual particulates, cations, anions, nitrite ions and the freezing point depressant;
(e) passing the produced engine coolant liquid of step (c) through a second mechanical filtering means for filtering and wherein at least part of the residual particulates is removed to produce an engine coolant liquid having cations, anions, nitrite ions, and the freezing point depressant;
(f) passing the produced engine coolant liquid of step (e) through a strong acid cation exchange bed in the hydrogen form wherein at least part of the cations is removed and at least part of the nitrite ions is converted into a gas containing nitrogen and selected from the group consisting of nitric oxide, nitrogen dioxide, and mixtures thereof, to produce an engine coolant liquid having anions, the gas containing nitrogen, and the freezing point depressant;
(g) passing the produced engine coolant liquid of step (f) through a strong base anion exchange bed in the hydroxide form wherein at least part of the anions is removed to produce an engine coolant liquid having the gas containing nitrogen and the freezing point depressant; and
(h) removing at least art of the gas containing nitrogen by passing the produced engine coolant liquid of step (g) through a bed of activated particulate carbon wherein at least part of the gas containing nitrogen is removed to produce an engine coolant liquid having the freezing point depressant.

48. The method of claim 47 wherein said chemical filtering means comprises a mechanical filter surrounded by activated carbon particulates.

49. The method of claim 47 where said activated particulate carbon comprises a surface area of from about 900 m$^2$/g to about 1100 m$^2$/g with an apparent density of from about 0.44 to about 0.55.

50. The method of claim 49 wherein said activated particulate carbon additionally includes a mesh size ranging from about 12×16 to about 20×24.

51. A method for removing particulates, hydrocarbons, cations, anions and nitrite ions from an engine coolant liquid having a freezing point depressant comprising the steps of:
(a) providing an engine coolant liquid having particulates, hydrocarbons, cations, anions and nitrite ions, and a freezing point depressant;
(b) passing the engine coolant liquid of step (a) through a means for pumping wherein the engine coolant liquid of step (a) is pumped towards a first mechanical filtering means for filtering;
(c) passing the engine coolant liquid of step (b) through a first mechanical filtering means for filtering and wherein part of the particulates are removed to produce an engine coolant liquid having residual particulates, hydrocarbons, cations, anions, nitrite ions, and the freezing point depressant;
(d) passing the engine coolant liquid of step (c) through a chemical filtering means for filtering and wherein at least part of the hydrocarbons is removed to produce an engine coolant liquid having residual particulates, cations, anions, nitrite ions and the freezing point depressant;
(e) passing the produced engine coolant liquid of step (d) through a second mechanical filtering means for filtering and wherein at least part of the residual particulates is removed to produce an engine coolant liquid having cations, anions, nitrite ions, and the freezing point depressant;
(f) passing the produced engine coolant liquid of step (e) through a strong acid cation exchange bed in the hydrogen form wherein at least part of the cations is removed and at least part of the nitrite ions is converted into a gas containing nitrogen and selected from the group consisting of nitric oxide, nitrogen dioxide, and mixtures thereof, to produce an engine coolant liquid having anions, the gas containing nitrogen, and the freezing point depressant;
(g) passing the produced engine coolant liquid of step (f) through a strong base anion exchange bed in the hydroxide form wherein at least part of the anions is removed to produce an engine coolant liquid having the gas containing nitrogen and the freezing point depressant; and
(h) passing the produced engine coolant liquid of step (g) through a bed of activated particulate carbon wherein at least part of the gas containing nitrogen is removed to produce an engine coolant liquid having the freezing point depressant.

52. A method for removing particulates, hydrocarbons, cations, anions and nitrite ions from an engine coolant liquid comprising the steps of:
(a) providing an engine coolant liquid having particulates, hydrocarbons, cations, anions and nitrite ions;
(b) passing the provided engine coolant liquid of step (a) through a means for pumping wherein the provided engine coolant liquid of step (a) is pumped towards a first mechanical filtering means for filtering;
(c) passing the engine coolant liquid of step (b) through a first mechanical filtering means for filtering and wherein part of the particulates are removed to produce an engine coolant liquid having residual particulates, hydrocarbons, cations, anions, nitrite ions;
(d) passing the engine coolant liquid of step (c) through a chemical filtering means for filtering and wherein at least part of the hydrocarbons is removed to produce an engine coolant liquid having residual particulates, cations, anions, and nitrite ions;
(e) passing the produced engine coolant liquid of step (d) through a second mechanical filtering means for filtering and wherein at least part of the residual particulates is removed to produce an engine coolant liquid having cations, anions, and nitrite ions;
(f) passing the produced engine coolant liquid of step (e) through a strong acid cation exchange bed in the hydrogen form wherein at least part of the cations is removed and at least part of the nitrite ions is converted into a gas containing nitrogen and selected from the group consisting of nitric oxide, nitrogen dioxide, and mixtures thereof, to produce an engine coolant liquid having anions, the gas containing nitrogen;
(g) passing the produced engine coolant liquid of step (f) through a strong base anion exchange bed in the hydroxide form wherein at least part of the anions is removed to produce an engine coolant liquid having the gas containing nitrogen;
(h) removing at least part of the gas containing nitrogen and selected from the group consisting of nitric oxide, nitrogen dioxide, and mixtures thereof by passing the produced engine coolant liquid of step (g) through a bed of activated particulate carbon wherein at least part of the gas containing nitrogen is removed.

* * * * *